United States Patent
Ramey

(10) Patent No.: US 10,229,083 B1
(45) Date of Patent: Mar. 12, 2019

(54) COMPUTING IN PARALLEL PROCESSING ENVIRONMENTS

(71) Applicant: Carl G. Ramey, Westborough, MA (US)

(72) Inventor: Carl G. Ramey, Westborough, MA (US)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 15/693,863

(22) Filed: Sep. 1, 2017

Related U.S. Application Data

(62) Division of application No. 14/636,296, filed on Mar. 3, 2015.

(60) Provisional application No. 61/948,110, filed on Mar. 5, 2014.

(51) Int. Cl.
G06F 13/42 (2006.01)
G06F 13/40 (2006.01)

(52) U.S. Cl.
CPC ...... G06F 13/4221 (2013.01); G06F 13/4022 (2013.01)

(58) Field of Classification Search
CPC .......................... G06F 13/4221; G06F 13/4022
USPC .......................................................... 710/105
See application file for complete search history.

(56) References Cited

U.S. PATENT DOCUMENTS

| | | | | |
|---|---|---|---|---|
| 6,195,679 B1 * | 2/2001 | Bauersfeld | ........ | G06F 17/30873 707/E17.111 |
| 6,430,657 B1 * | 8/2002 | Mittal | ................. | G06F 12/0837 711/118 |
| 7,539,845 B1 * | 5/2009 | Wentzlaff | ............ | G06F 15/8007 712/10 |
| 8,327,187 B1 * | 12/2012 | Metcalf | ............... | G06F 13/4068 714/10 |
| 8,521,963 B1 * | 8/2013 | Miao | ................... | G06F 13/4221 711/120 |
| 8,738,860 B1 * | 5/2014 | Griffin | ................ | G06F 12/0897 711/122 |
| 2002/0172199 A1 * | 11/2002 | Scott | ................... | G06F 12/1072 370/389 |
| 2002/0199113 A1 * | 12/2002 | Pfister | ..................... | G06F 9/526 718/100 |
| 2003/0061395 A1 * | 3/2003 | Kingsbury | .............. | G06F 9/544 719/312 |
| 2008/0183979 A1 * | 7/2008 | Larson | .................... | G06F 9/526 711/154 |
| 2008/0288683 A1 * | 11/2008 | Ramey | ................ | G06F 13/4022 710/105 |
| 2010/0050177 A1 * | 2/2010 | Goyal | ................... | G06F 21/552 718/102 |

(Continued)

*Primary Examiner* — Christopher B Shin
(74) *Attorney, Agent, or Firm* — Fish & Richardson P.C.

(57) ABSTRACT

A computing system comprises one or more core processors coupled to a communication network among the cores via a switch in each core and switching circuitry to forward data among cores and switches. Features include a programmable classification processor for directing packets, techniques for managing virtual functions on an IO accelerator card, packet scheduling techniques, multi-processor communication using shared FIFOs, programmable duty cycle adjustment and delay adjustment circuits, a new class of instructions that use a ready bit, and cache coherence and memory ordering techniques.

23 Claims, 22 Drawing Sheets

(56) References Cited

U.S. PATENT DOCUMENTS

| | | | |
|---|---|---|---|
| 2012/0144170 A1* | 6/2012 | Singh | G06F 9/526 |
| | | | 712/223 |
| 2013/0151750 A1* | 6/2013 | Kanigicherla | G06F 13/4022 |
| | | | 710/313 |
| 2013/0339805 A1* | 12/2013 | Aho | G06F 11/3006 |
| | | | 714/48 |
| 2014/0059422 A1* | 2/2014 | Devara | G06F 17/2247 |
| | | | 715/234 |
| 2014/0075147 A1* | 3/2014 | Stark | G06F 9/467 |
| | | | 711/205 |
| 2014/0282611 A1* | 9/2014 | Campbell | H04L 49/109 |
| | | | 719/313 |
| 2016/0055041 A1* | 2/2016 | Kruglick | H04L 45/00 |
| | | | 719/313 |
| 2017/0078458 A1* | 3/2017 | Ishihara | H04L 69/22 |

* cited by examiner

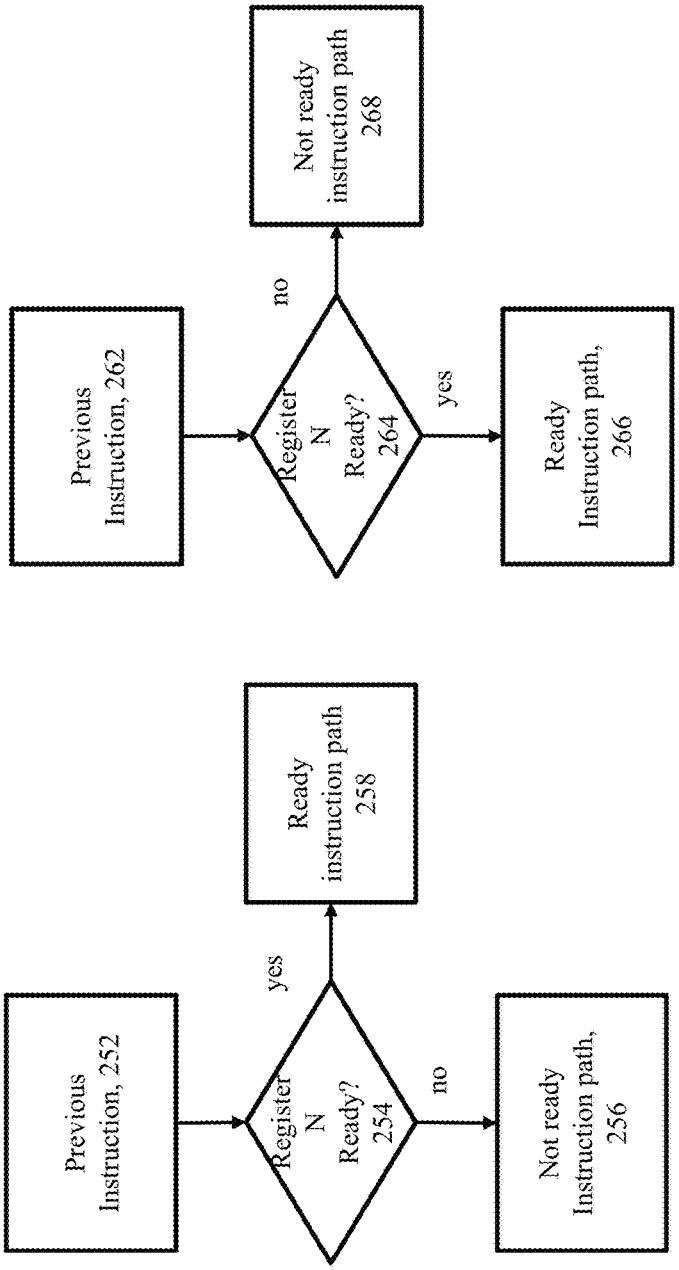

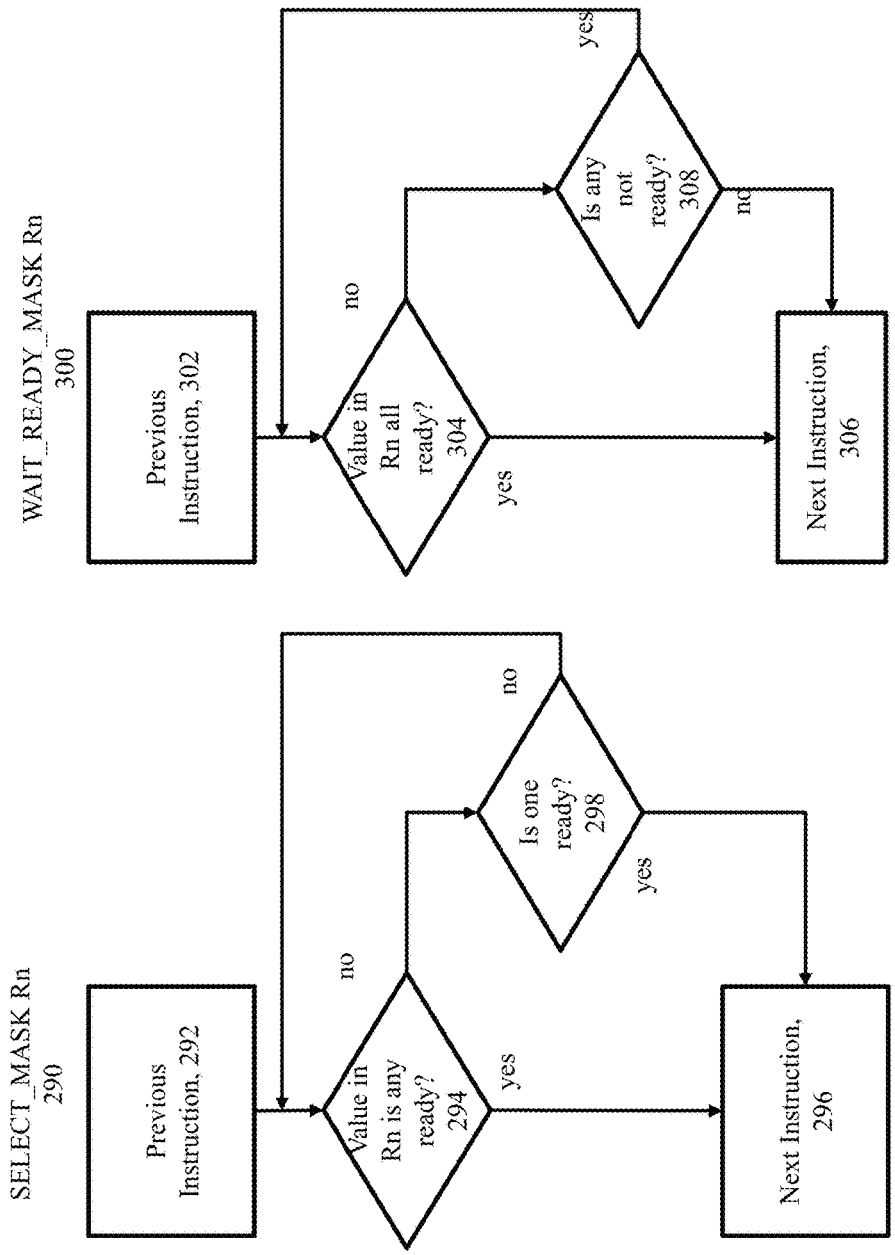

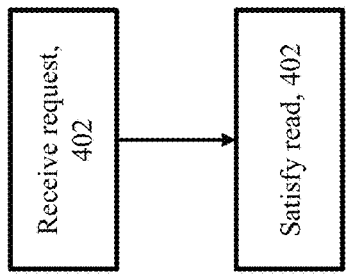
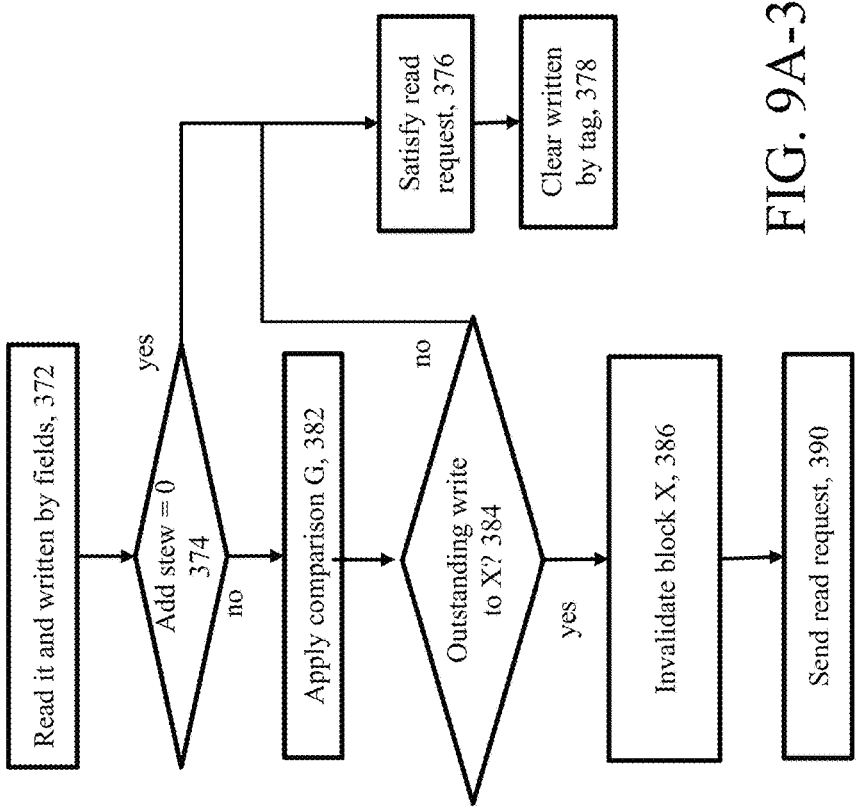
FIG. 9A-4
FIG. 9A-3

COMPUTING IN PARALLEL PROCESSING ENVIRONMENTS

CLAIM OF PRIORITY

This application claims priority under 35 U.S.C. § 119(e) to provisional U.S. Patent Application 61/948,110, filed on Mar. 5, 2014, entitled: "Computing in Parallel Processing Environments", the entire contents of which are hereby incorporated by reference.

BACKGROUND

This description relates to computing in parallel processing environments.

FPGAs (Field Programmable Gate Arrays) and ASICs (Application Specific Integrated Circuits) are two exemplary approaches for implementing customized logic circuits. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs typically consume more power for performing comparable functions as an ASIC and their performance can be 10 to 20 times worse than that of an ASIC.

Multicore systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software.

Software defined networking allows the network data plane to be implemented in an external server. The forwarding plane, sometimes called the data plane, defines the part of the router architecture that decides how to forward packets arriving on an inbound interface.

Modern servers use virtual functions that are implemented in add-in accelerator cards to serve multiple virtual machines (VMs) running on a single host processor. This topology is commonly referred to as SRIOV (single root IO virtualization).

When many packet flows target a single output port, bandwidth management is employed to implement quality of service and policy guarantees.

When multiple processors communicate across a fabric such as PCI Express or Ethernet, the processors typically use shared first in first out memory devices (FIFOs) to send messages. These FIFOs require mutual exclusion (MUTEX) locks to support many-to-one, one-to-many, or many-to-many transfers. The MUTEX locks allow the sender to check for full access, acquire a slot to send messages, and write an entry to a destination without another sender interfering with the transfer. Similarly, a receiver may require a MUTEX lock in order to check for a non-empty FIFO and grab the next valid entry. MUTEX locks can become bottle necks in high performance systems, because MUTEX locks require exclusivity; only a single sender or receiver can be performing a transfer at a given time and all others are required to wait. Commonly, this waiting by such agents to acquire a lock is referred to as "spinning."

Complex digital integrated circuits (ICs) require precise coordination of the timing among many different paths in order to function correctly, especially at relatively high clock frequencies. In modern integrated circuit processing technologies, e.g., 40 nm, 28 nm, and 22 nm process generations, there can be significant process variability among transistors and conductors on circuit paths, which affect relative timing of clock and data signals. Such process variations can limit the maximum clock frequency of an IC and/or, in some cases, cause functional errors during operation.

A Load instruction tells a processor core to take the memory address in one register and load the value stored at that memory location into a second register, the destination register. The cache or memory system can take one to hundreds or more clock cycles to return the value from memory to the processor core. To avoid stalling during that time, the processor core marks the destination register of the load as not-ready until the value is returned from memory. This is done by keeping a ready bit for each register. The processor core continues to execute instructions. If an instruction tries to use a register that is marked as not-ready, the processor core stalls until the ready bit for that register is changed to ready indicating that the value was returned from memory. Processors use different methods to avoid stalling on this case. For example, out-of-order processors with compilers find other instructions to execute where the input registers are ready and run those. This uses more hardware than an in-order processor. Another technique is speculative execution, where such speculative execution processors switch into a speculative mode instead of stalling and speculatively execute instructions, but do not change the state stored in any registers until the processor commits results of the speculative execution.

With most common shared memory multiprocessor memory ordering models, when a processor core X writes a memory location M, processor core X is permitted to observe its own write to memory location M before other processors observe the write operation to the memory location M.

SUMMARY

While a software defined networking allows a network data plane to move into a computer server and may improve flexibility of a system as a whole, moving the network data plane into the computer server is such a manner introduces loading issues into the server.

According to an aspect, a system includes a tiled multicore processor that includes plural processor tiles, the processor tiles comprising a processor, memory and a switch, and a programmable classification processor that comprises a processor table memory and instruction memory, with instruction memory storing a program that defines rules for packet delivery and switching, with the programmable classification processor directing packets out of any port on the programmable classification processor without intervention from any of the tile processors.

The programmable classification processor provides a dynamically programmable data plane in the multicore processor network interface. The programmable classification processor disposed at the front end of the network interface enables use of software defined rules for packet delivery and switching. The programmable classification processor provides a programmable front end directs packets out of any port on the processor without any intervention from the tile processors. However, when the programmable classifier processor based on the rules determines that a packet should be handled by a tile processors rather than the programmable classification processor, the programmable classification processor forwards the packet to a processing queue of the tile processor. Thus, the tile processors can implement exception handling and slow path operations, while allowing the programmable classification processor to direct all fast-path operations. Fast-path operations on packets are directed by the programmable classification processor out of any port with minimal latency and processing overhead. As conditions change (new flows, new processing rules, new applications, network topology changes), the tile processors can dynamically direct the programmable classification processor to implement new policies for forwarding and local processing ("rules"). Updates to rules can happen in real time while traffic is arriving at full line rates and thus no packets would generally be lost during updates. The tile processors can be used to handle higher level application and control plane workloads without the burden of data-plane operations/tasks.

Many network interface cards (NICs) provide some processing to offload the processing at the server to support, e.g., layer-2 functions. However, these solutions lack flexibility of a fully programmable solution. Software defined networking requires a dynamic and programmable data plane. However, as the number of virtual machines (VMs) increase, so too does the number of single root IO virtualizationS (SRIOV), e.g., virtual functions (VFs) implemented on the system's "add in IO" cards such as network interfaces, graphics accelerators, and storage controllers. The number of VMs may easily outpace the number of independent applications or client threads running on the IO card. In many systems, the IO card is implemented using programmable microprocessors. Threads are run on these microprocessors to implement various services.

According to an aspect, a method for managing virtual functions on an IO accelerator card in an embedded multi-core processor, includes receiving by the IO accelerator card, read and write transactions from a virtual machine, which are sent to an associated virtual function (VF) on the IO card. The method also includes slicing by a processor device virtual machines' address spaces into per-application/thread regions on the IO accelerator card, by the slicer rearranging IO address space for virtual functions such that all of the address space a thread needs to use across all of the various virtual functions (VFs) that the thread is involved with are re-packed into a contiguous address space, and matching the sliced addresses against a set of address regions to determine which address region the sliced address belongs to.

The map slicer rearranges the IO address space such that all of the address space a thread needs to see across all the VFs is re-packed into a contiguous address space. This address space is separated from the other threads' spaces. The map slicer slices the addresses of the virtual functions based on a programmable slice size value and offset value that are user supplied. The slicer produces remapped addresses on a thread basis such that a set of threads has respective address space needs for virtual functions (VFs). When a transaction is a doorbell interrupt, a packer manipulates the address to turn byte/word addresses into bit addresses.

While bandwidth management has traditionally been implemented using a "leaky bucket" or scheduling schemes, this is problematic as modern systems also use weighted arbitration policies to provision available bandwidth between multiple flows. Merely, combining these schemes introduces complex hardware and potentially inefficient/ unfair packet scheduling. Furthermore, traditional weighted round-robin algorithms suffer from "bursty" performance and thus do not scale efficiently in hardware implementations.

According to an additional aspect, a method for packet scheduling in an embedded multicore processor includes providing a shared token bucket counter for each flow to schedule of a plurality of flows, incrementing shared token bucket counters by applying tokens for both bandwidth-limited (BL) and weighted round robin (WRR) policy controls according to flows, and feeding counts from the counters to a round robin arbiter.

The technique for packet scheduling uses a shared token bucket (counter) for both bandwidth-limited (BL) and weighted round robin (WRR) policy controls. Using the shared token bucket for both the time based refresh used for BL scheduling and the "availability" based refresh used for WRR scheduling, allows the same hardware to be efficiently used for both schemes simultaneously.

Use of a MUTEX lock in peer-to-peer systems connected via a fabric such as PCI Express or Ethernet, can involve significantly more costs to computational efficiencies as the latency to acquire and release locks increases. Modern fabrics have added enhanced atomics such as a FetchAndAdd instruction to reduce the need for MUTEX locks. Enhanced atomic operation instructions such as FetchAndAdd are useful to reduce locks as they provide a serialization point for the operation without requiring acquire/release semantics. Unfortunately, FetchAndAdd operations do not provide flow control. For example, if a FIFO is full and a sender tries to write the next entry to the full FIFO, execution of the FetchAndAdd will cause an overflow potentially causing an error case or loss of data.

According to an aspect, a method for multi-processor communication using shared FIFOs and a FetchAndAdd operation includes performing by a sender node a fetch add operation, remapping the fetch add operation to an associated atomic operation on a fabric transport, and atomically converting by a receiver node the remapped operation to a FetchAddGEZ operation.

This approach does not require any modification of existing fabric mechanisms. Instead, the approach is layered as a service at sender and receiver nodes and can be mapped to a specific address or set of addresses. This allows shared a FIFO implementation to be deployed over existing fabrics without any modifications as long as the receivers can implement a FetchAddGEZ operation in their memory system.

Some paths in an IC are constrained to complete their processing within a single phase of a clock period, i.e., between the rising and falling edges of the clock. For these paths, the duty cycle of the clock is an especially sensitive parameter. Process variations can skew the duty cycle of the clock and reduce the amount of time needed for paths on one of the phases, while providing excess time to paths on the opposite phase. Alternatively, process variations may affect paths on opposite clock phases differently, thus shifting the optimal duty cycle of the clock. Because process variations are unknown at the time of design and, furthermore, can be different among parts fabricated from the same design, one approach is to add a programmable duty cycle adjustment circuit into some clocks. Because the duty cycle can be programmed after fabrication, it can be configured specifically to resolve timing problems due to process variations. However, the duty cycle adjustment circuit is also subject to process variation, and requires a robust configuration without sacrificing performance or consuming too much power.

According to an aspect, a programmable duty cycle adjustment circuit, includes one or more serial duty cycle adjustment stages, each of which is selectably inserted or selectably bypassed, each duty cycle adjustment stages including respective delay chains to adjust the duty cycle of a stage, each duty cycle adjustment stage applies delay to only one direction of a signal transition.

A robust duty cycle adjustment circuit comprises multiple serial and individually selectable adjustment stages, such that the overall duty cycle of a signal can be adjusted by selecting or deselecting different combinations of stages. Each stage adjusts the duty cycle by applying delay only to one edge (i.e., rising or falling edges) of an input signal to the circuit, which is usually a clock signal. Delay chains of different lengths using a unit delay cell provide robustness to systematic process variations and ensure configurability. The circuit makes efficient use of a small number of gates efficiently to conserve power and area.

Delay circuitry is also used for resolving timing problems due to process variations. However, the delay circuitry is also subject to process variation, and requires a robust configuration without sacrificing performance or consuming too much power. Process variations are unknown at the time of design and, furthermore, can be different among parts fabricated from the same design.

According to an additional aspect, a programmable delay adjustment circuit, includes one or more serial delay adjustment stages, each of which is selectable or bypassed individually, each delay adjustment stage including a delay chain, a multiplexer selected using a selection bit that controls selection of inputs to the multiplexer, and bypass circuitry to bypass the programmable delay circuit.

A robust delay circuit includes multiple delay chains of various lengths using a common unit cell. The delay chains are serial and individually selectable, such that the overall delay can be adjusted by selecting or deselecting different combinations of chains. Delay chains of different lengths using a unit delay cell provide robustness to systematic process variations and ensure high configurability. The circuit makes efficient use of a small number of gates to conserve power and area.

An alternative approach to avoid stalling is to add instructions that can directly examine the ready state of a register. This allows a program to avoid stalling by changing the flow of control to avoid using a register that is not ready.

According to an additional aspect, a method executed in multiprocessor core includes marking by a processor core a destination register of a load instruction that is not-ready until a value is returned from memory by keeping a ready bit for the destination register and executing instructions that directly examine the ready state of the register by using as an operand of the instructions the ready bit.

By adding new disclosed instructions, a processor can obtain some of the benefits of out-of-order execution and/or speculative execution processor, but at a much lower hardware cost. The instructions directly use the ready bit associated with the destination register, and thus such processors can avoid stalling in many instances and obtain some of the performance improvements of out-of-order execution or speculative execution with little hardware cost.

Maintaining cache coherence in some processor architectures if a processor core other than X observes the write of M, then at that point the write of M should be visible to all processors in the coherence domain. This presents a challenge for hierarchical multicore processors, where two or more processor cores (core A and core B) share a local cache bank (two or more processors cores and cache bank referred to here as a cluster). If core A writes location X and updates the local cache bank that is shared between core A and B, and then core B reads location X, core B has observed the write to location X prior to all other cores in the multicore processor, likewise observing the write to location X. This can result in either incorrect parallel software or low-performance hardware solutions to avoid this "early visibility" of writes.

According to an aspect, a method for maintaining cache coherence and memory ordering in a computing system includes producing N-bit compressed representations of write addresses that have been sent to a cache coherence controller, indicating whether a new address X has been sent to the coherence controller and has been mixed into the representation, incrementing an outstanding write counter, sending the write to a coherency controller, receiving an acknowledgement and decrementing the write controller and clearing the compressed representation whenever the outstanding write counter clears to zero.

Provided is an address hashing scheme that uses write addresses and is employed to reduce the frequency of "forced invalidates" of a cache block. A hash function produces an N-bit compressed representation of the write addresses that have been sent to the coherence controller, which can be checked for subsequent operations, e.g., read requests for the cache block.

Other features and advantages will become apparent from the following description, and from the claims.

DESCRIPTION OF DRAWINGS

FIGS. 8A-8F are flow charts of operations for various computer instructions.
FIGS. 9A-1 to 9A-4 are flow charts of cache control operations.

DESCRIPTION

1 Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

Figure 1A:
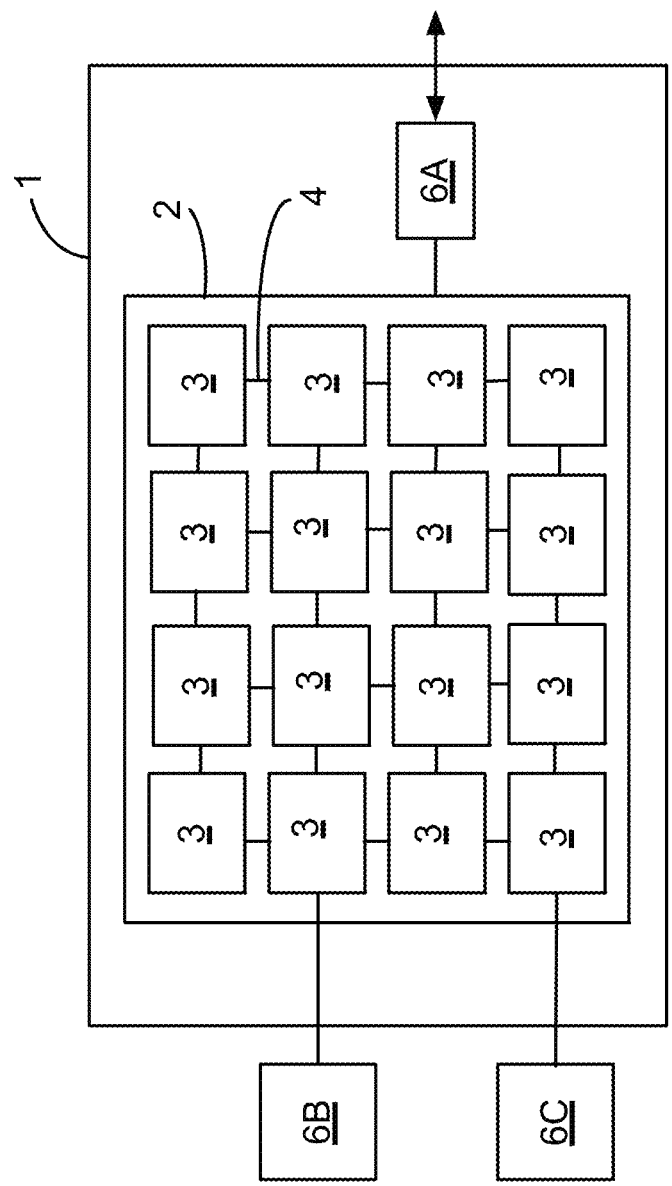
FIG. 1A is a block diagram of a tiled integrated circuit.

Referring to FIG. 1A, an integrated circuit 1 (or "chip") includes an array 2 of interconnected tiles 3. Each of the tiles 3 is a functional unit that includes a processor (or "processor core") and a switch that forwards data from other tiles to the processor and to switches of other tiles over data paths 4. The switch is coupled to the processor so that data can be sent to or received from processors of other tiles over the communication fabric formed by the switches and data paths. The integrated circuit 1 includes other on-chip circuitry such as input/output (I/O) interface circuitry to couple data in and out of the circuit 1, and clock distribution circuitry to provide clock signals to the processors of the tiles.

The integrated circuit 1 shown in FIG. 1A includes a two-dimensional array 2 of rectangular tiles with data paths 4 between neighboring tiles to form a mesh network. The data path 4 between any two tiles can include multiple conductor paths (or "wires") to support parallel channels in each direction. Optionally, specific sets of conductors between two tiles can be dedicated to different mesh networks that can operate independently.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 4 from one or more tiles at the edge of the network can be coupled out of the array of tiles 2 (e.g., over I/O pins) to an on-chip device 6A, an off-chip device 6B, or a communication channel interface 6C, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the integrated circuit 1.

The following exemplary implementations are described in the context of tiles that have the same structure and functionality. Alternatively there can be multiple "tile types" each having different structure and/or functionality. For example, tiles that couple data off of the integrated circuit 1 can include additional circuitry for I/O functions.

Figure 1B:
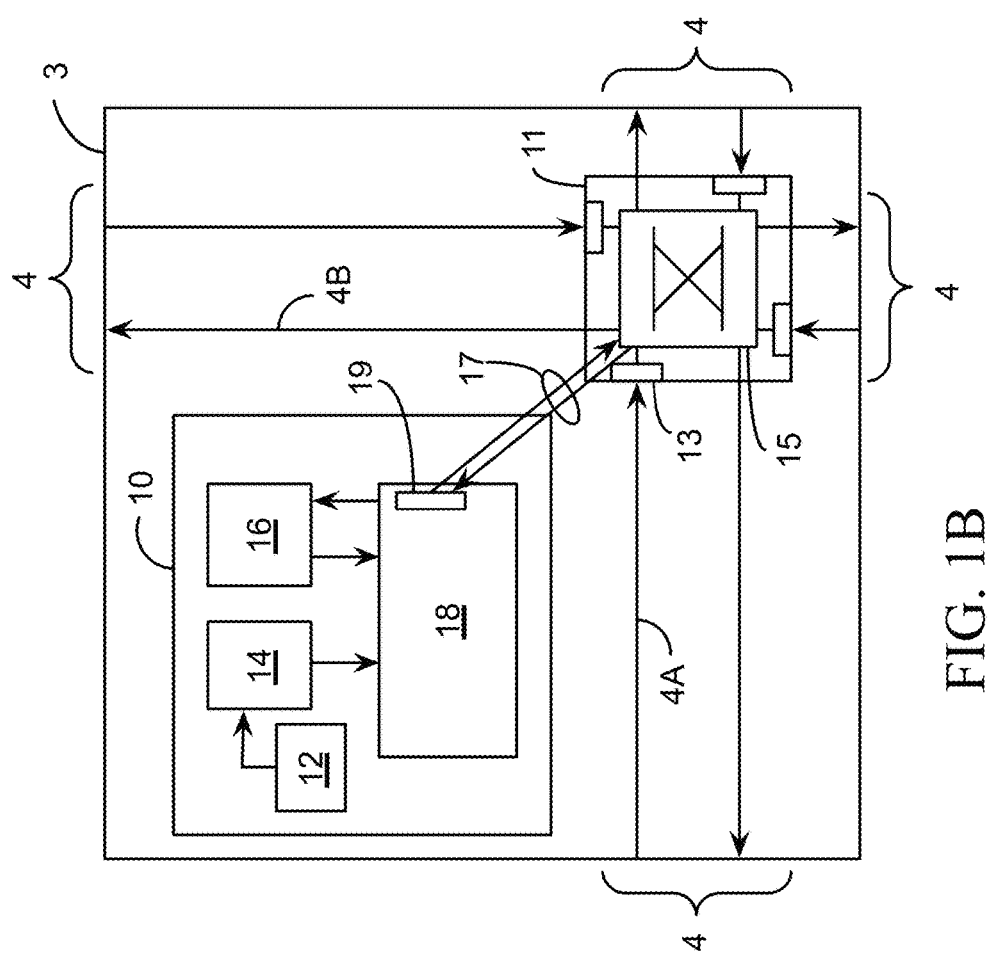
FIG. 1B is a block diagram of a tile.

Referring to FIG. 1B, a tile 3 includes a processor 10, a switch 11, and sets of incoming conductors 4A and outgoing conductors 4B that form the data paths 4 for communicating with neighboring tiles. The processor 10 includes a program counter 12, an instruction memory 14, a data memory 16, and a pipeline 18. The processor 10 can use any of a variety of pipelined architectures. The pipeline 18 includes pipeline registers, functional units such as one or more arithmetic logic units (ALUs), and temporary storage such as a register file. The stages in the pipeline 18 include, for example, instruction fetch and decode stages, a register fetch stage, instruction execution stages, and a write-back stage.

Either or both of the instruction memory 14 and data memory 16 can be configured to operate as a cache for off-chip memory. The cache hierarchy can take many forms, and the description here is just one example. For example, the instruction memory 14 includes an instruction cache that caches instructions, which can be a level 1 instruction cache (L1I), and the data memory 16 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. Typically, the processor checks the cache in another tile called the home tile for that particular address that missed. This way, the L2U caches in the other tiles serve as a large distributed L3 cache. If the home tile has an entry for the data item (within a home location of a home cache in the home tile), the home tile can supply the data item to the requesting tile. If even the home tile causes a cache miss, then, as an example, the home tile handles the cache miss by sending the cache request to external memory (to DRAM typically) and obtains the data item from the external memory. The cache miss from the requesting tile gets turned into a message that traverses the network to get to the home tile. Similarly, the miss from the home tile to DRAM traverses the network.

Sometimes, instead of checking a home tile on a cache miss to the cache within a tile, the request is sent directly outside the chip to external DRAM memory.

A tile 3 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location for a given cache line is stored in a translation lookaside buffer (TLB) along with the page information for that cache line. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 10 can be multithreaded and/or have capabilities of a Very Long Instruction Word (VLIW) processor, a superscalar processor, or a vector processor.

Together the switches 11 in a multicore chip provide the communications infrastructure for all the cores. Switches can be built in many ways. As one example, the switch 11 includes input buffers 13 for temporarily storing data arriving over incoming conductors 4A, and switching circuitry 15 (e.g., a crossbar fabric) for forwarding data to outgoing conductors 4B or the processor 10. The input buffering provides pipelined data channels in which data traverses a data path 4 from one tile to a neighboring tile in predetermined number of clock cycles (e.g., a single clock cycle). This pipelined data transport enables the integrated circuit 1 to be scaled to a large number of tiles without the need to limit the clock rate to account for effects due to conductor lengths such as propagation delay or capacitance. (Alternatively, the buffering could be at the output of the switching circuitry 15 instead of, or in addition to, the input.)

A tile 3 controls operation of the switch 11 using either the processor 10, or separate switch processor dedicated to controlling the switching circuitry 15. Separating the control of the processor 10 and the switch 11 allows the processor 10 to take arbitrary data dependent branches without disturbing the routing of independent messages passing through the switch 11.

In some implementations, the switch 11 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 10 receives a stream of compound instructions with a first instruction for execution in the pipeline 18 and a second instruction for controlling the switching circuitry 15.

The switch instructions enable efficient communication among the tiles for communication patterns that are known at compile time. This type of routing is called "static routing." An example of data that would typically use static routing are operands of an instruction to be executed on a neighboring processor.

The switch also provides a form of routing called "dynamic routing" for communication patterns that are not necessarily known at compile time. Dynamic routing is also used for messages that result from cache misses or other cache coherence related transactions. In dynamic routing, circuitry in the switch 11 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 11 includes dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 11 is coupled to the processor 10 over processor coupling wires 17. For fast (e.g., low latency) communication between tiles of neighboring processors, the coupling wires 17 are integrated directly into the pipeline 18. The processor 10 communicates with the switch 11 using distinct opcodes to distinguish between accesses to the static and dynamic network ports. Alternatively, the instructions can use register names to refer to switch ports. For example, the processor can send or receive data by writing to or reading from a register interface that is directly mapped to the input buffers 13 of the switch 11. For data going to or coming from the processor 10, a switch instruction indicates that the switch 11 should couple data to or from a selected register or bypass path of the pipeline 18 over a register mapped pipeline integrated switch interface 19. This pipeline integration allows data to be available to the switch 11 the moment an instruction is executed and the register value is available. In the next cycle the same data could appear at an input buffer of another tile.

To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 3 can include various types of memory modules to serve as the instruction memory 14, data memory 16, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 3 or the integrated circuit 1. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 3 can include a translation lookaside buffer (TLB) to translate virtual addresses as they come out of the processor 10 on each tile 3. Separate TLBs for instruction and data can also be used. A mode bit for each can turn off translation. Events such as cache miss or translation fault can trigger a trap or interrupt to the processor 10, so that the processor 10 can handle the event in software (using instructions executed by the processor).

The software running on the processor 10 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 10. Alternatively, there are few trap lines, but there is a trap vector that the processor 10 can access which encodes the type of trap that occurred. There is a mode indicator, which can allow selecting whether the software or the hardware handles these events. A hardware cache tag file can export a hit/miss status to the software rather than stalling the processor pipeline.

An array of tiles 2 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 3 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 10 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

In this situation, it is useful to support a unified interface to the accelerators, such as in a MiCA interface (multicore interface for coprocessor acceleration). MiCA like interfaces can support direct transfer of data from the chip's caches to the accelerators. The accelerators can also be virtualized so that more cores can access the accelerators than there are accelerators.

Accelerators often have a queue of requests from processors (or cores or tiles). They can perform the operations requested in the requests in the order in which the requests were received (for example).

A software system for the tiled integrated circuit 1 includes a compiler that is able to schedule instructions for the processors in each of the cores. The compiler can also prepare communication over the static network, or messages to be sent over the dynamic network.

An exemplary operating system (OS) for the integrated circuit 1 can include a Linux-like kernel or a similar kernel running on a single tile 3. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

2 Programmable Classifier in a Multicore Processor Network Interface

Figure 2:
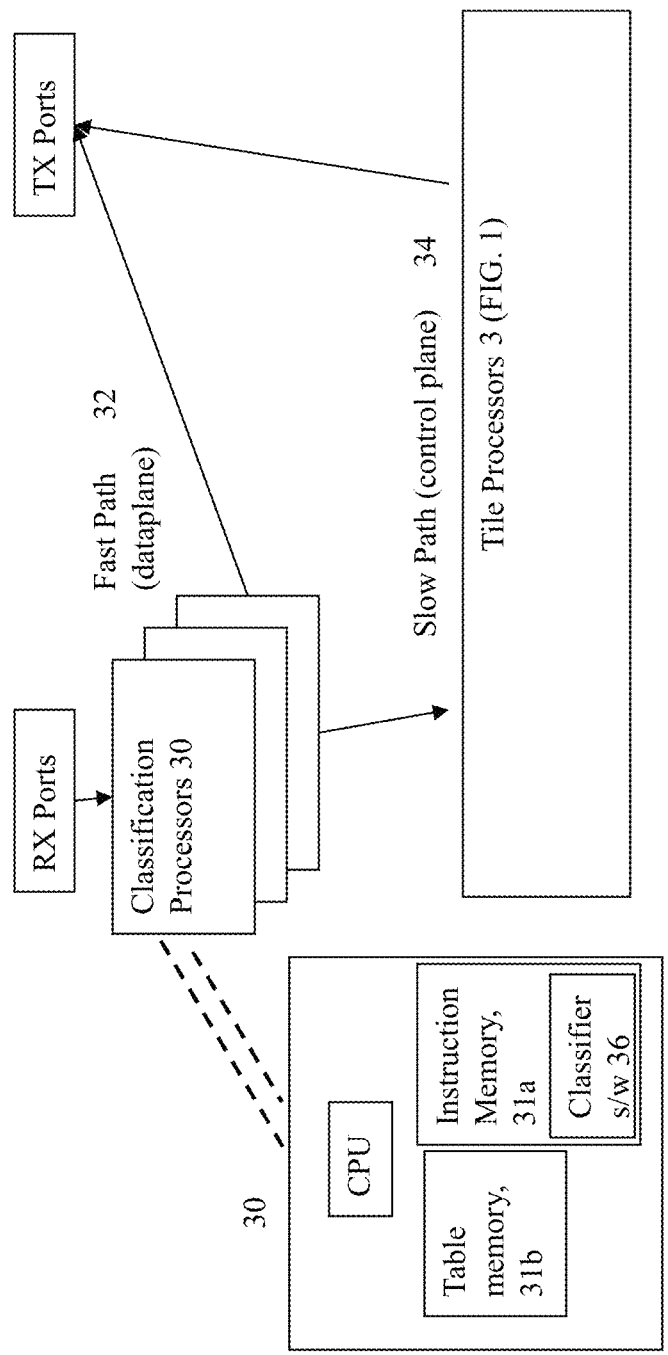
FIG. 2 is a block diagram of a front end classification processor.

Referring now to FIG. 2, a programmable classification processor 30 is provided at a front end of a network interface. Software 36 that defines rules for packet delivery and switching can be introduced. The programmable front end classification processor 30 directs packets out of any port on the processor 30 without intervention from the Tile processors 3. However, if the programmable classification processor 30 (classifier) determines that a packet should be handled by one of the Tile processors 3, the classification processor 30 causes the packet to be forwarded to a processing queue for processing by the Tile processor 3.

The Tile processors 3 implement exception handling and slow path 32 code execution, while allowing the classifier processor 30 to direct all fast-path 34 operations. Fast path packets are directed out of any port with minimal latency and processing overhead. As conditions change (new flows, new processing rules, new applications, network topology changes), the Tile processor 3 dynamically directs the programmable classification processor 30 to implement new policies (e.g., rules) for forwarding and local processing of such packets. These updates to the rules happen in real time while traffic is arriving at full line rates, thus mitigating against the possibility of lost packets during the update. The Tile processors (generally FIG. 1A, 1B) implement higher level application and control plane workloads without the burden of data plane operations.

As shown in FIG. 2, an example of a programmable classification processor 30 (classifier) includes a set of high speed RISC processors running software that may be updated on the fly by the Tile processors 3. Each classifier 30 has instruction memory 31*a* and table memory 31*b*. The classifier software 36 implements rules that allow packets to be identified based on their contents. Once identified, the packets are directed to an egress port or to one of the Tile processors. In the programmable classification processor 30 rules are updated dynamically by modifying the software and tables running on the classifier 30.

A fast path or data plane is implemented in hardware that allows the classifier 30 to switch packets out of any egress port without involving the Tile processors 3.

Figure 2A:
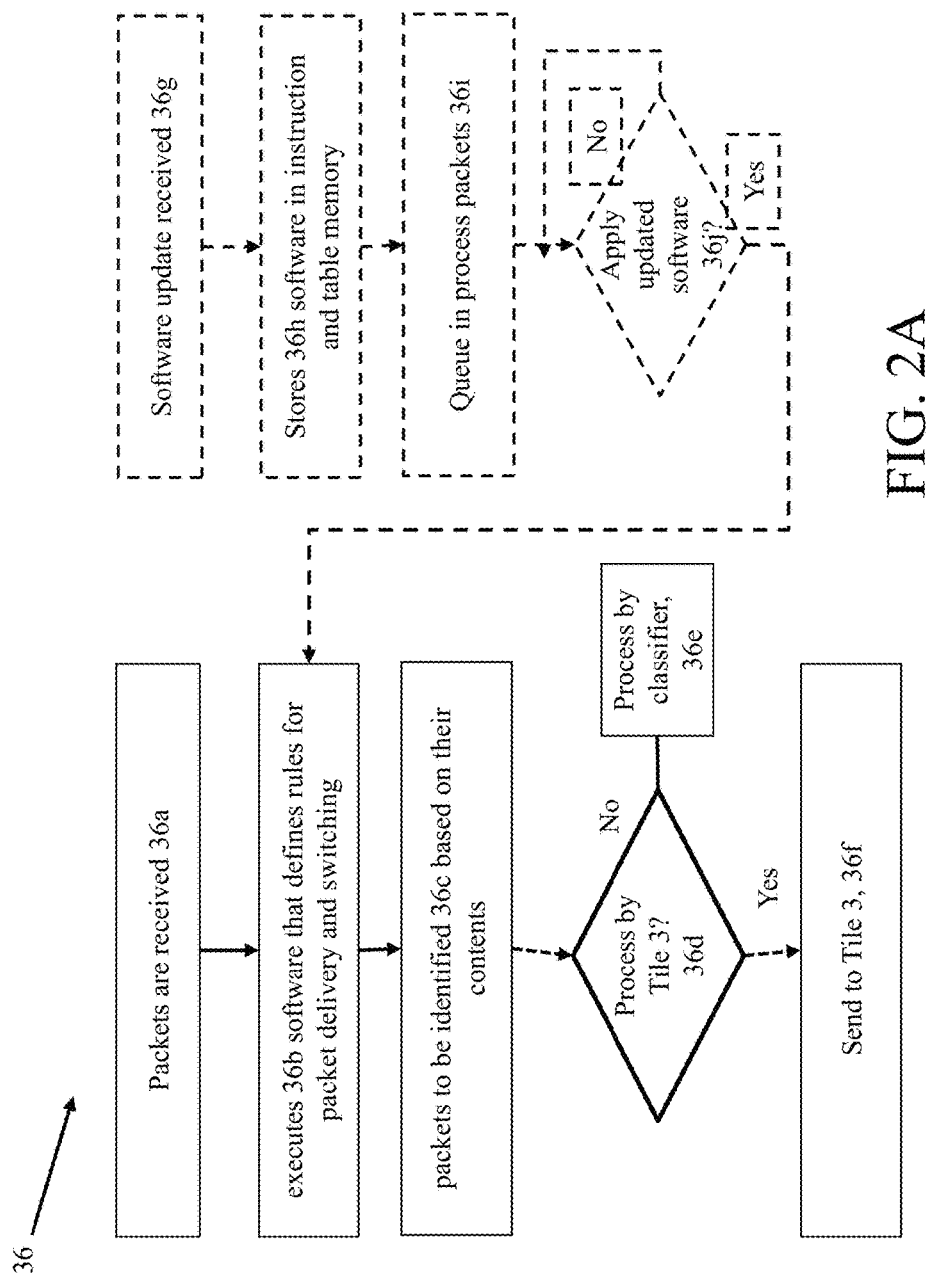
FIG. 2A is a flow diagram of processing in a classification processor.

Referring now to FIG. 2A, the programmable classification processor 30 processes 36 packets as follows: Packets are received 36*a* from the front end of the network interface. The programmable processor executes 36*b* software that defines rules for packet delivery and switching. The classifier software 36 implements rules that allow packets to be identified 36*c* based on their contents. Once identified, 36*d* the packets are directed 36*e* to an egress port of the interface or to one of the Tile processors 36*f* according to the rules defined in the classification software. Rules are typically user defined. Thus, at a high level the programmable front end classification processor 30 directs packets out of any port on the processor 30 without intervention from the Tile processors 3 unless the programmable classification processor 30 (classifier) determines that a packet should be handled by one of the Tile processors 3, in which case, the classification processor 30 causes the packet to be forwarded to a processing queue for processing by the Tile processor 3.

The programmable classification processor 30 receives 36*g* software that is updated on the fly by the Tile processors 3. The classifier 30 stores 36*h* updated software into instruction memory 31*a* (FIG. 2) and parameters into table memory 31*b* (FIG. 2). In the programmable classification processor 30 rules are updated dynamically by modifying the software and tables running on the classifier 30. The classifier processor 30 could also queue 36*i* incoming (e.g., in process) packets during a software update. The processor 30 would determine 36*j* when to apply the updated software 36*j* depending on various factors such as whether there are packets already being processed by a previous version of the software. The software implements various predefined processing rules that would vary depending on the nature of the network interface and system employing such device.

3 Managing Large Number of Virtual Functions in an Embedded Multicore Processor

Described are techniques for Virtual function management in an embedded server offload card. Mapping of independent virtual machines (VMs) to a shared input/output (IO) card thread is problematic because the various resources are disjoint across the address space of the virtual functions (VFs). For example, a first virtual function, e.g., VF[0], can have need for a set of control registers, a set of interrupts, and a data region. A second virtual function, e.g., VF[1] may require the same set of mappings for its address space. Many subsequent virtual functions, e.g., VF[2] . . . VF[n], where n is an arbitrary number corresponding to an arbitrary number of virtual function may require the same or similar mappings for the functions respective address spaces.

This situation is problematic when the IO card is configured to service all of those VFs' registers using a single execution thread, interrupts with another execution thread and data regions with still another execution thread. The three IO threads would typically have overlapping address spaces making address space isolation among the virtual functions difficult. Furthermore, with many virtual functions (VF's), e.g., 100's of such VFs implemented on the IO card, it can be inefficient to handle workload balancing as the VFs generally have to request service through a polled register interface or shared interrupt.

Figure 3:
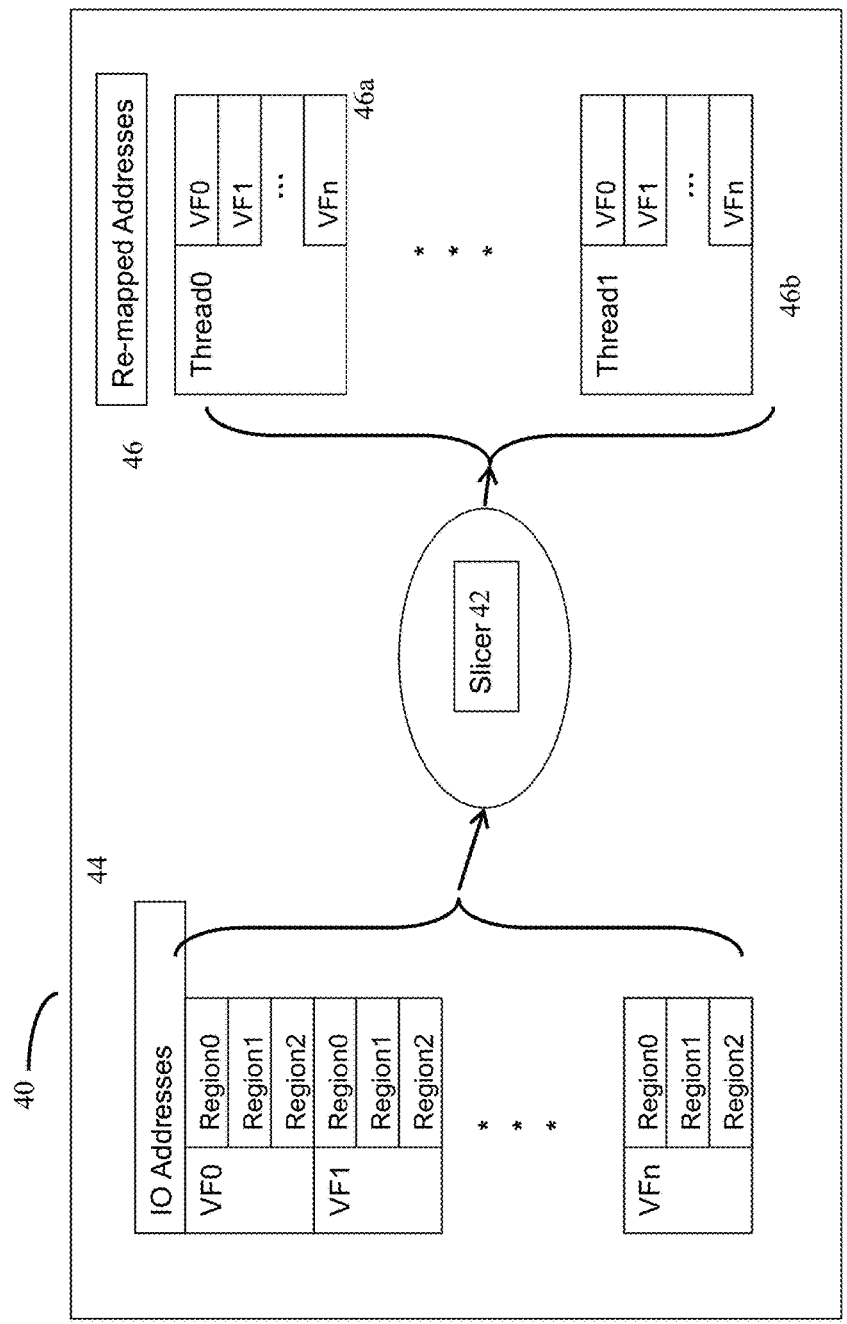
FIG. 3 is a block diagram depicting remapping of an IO (input/output) address space.

Referring to FIG. 3, in order to map many such virtual machines' (VMs') disjointed address spaces into per-application/thread regions on IO accelerator cards a mapping-slicer mechanism is used. As shown, an IO accelerator card 40 includes a slicer 42. The slicer 42 is a map slicer that rearranges IO address space for virtual functions such that all of the address space a thread needs to use across all of the various virtual functions (VFs) that the thread is involved with is re-packed into a contiguous address space. This address space is separated from the address spaces of all of the other threads, as shown.

As shown in FIG. 3, the I/O addresses required 44 of the virtual functions VF[0]; VF[1]; to VF[n] are shown. The I/O addresses required 44 of the virtual functions VF[0]; VF[1]; to VF[n] include the address regions where each virtual function executes, which in this example are region0, region1 and region2 for each virtual function. These address requirements or regions for the virtual functions are passed through the slicer 42, and the slicer 42 produces remapped addresses 46, as also shown. The remapped addresses 46 are provided on a thread basis such that a set of threads, e.g., Thread_0 to here Thread_1 (could be up to, e.g., Thread_n) has all of its respective address space needs for the various virtual functions (VFs) that thread will service, re-packaged into a set of contiguous address spaces 46*a* to here 46*b* per thread. That is, in the example shown in FIG. 3, (VF) requires thread0 and thread1 as do the other VF's.

Figure 3A:
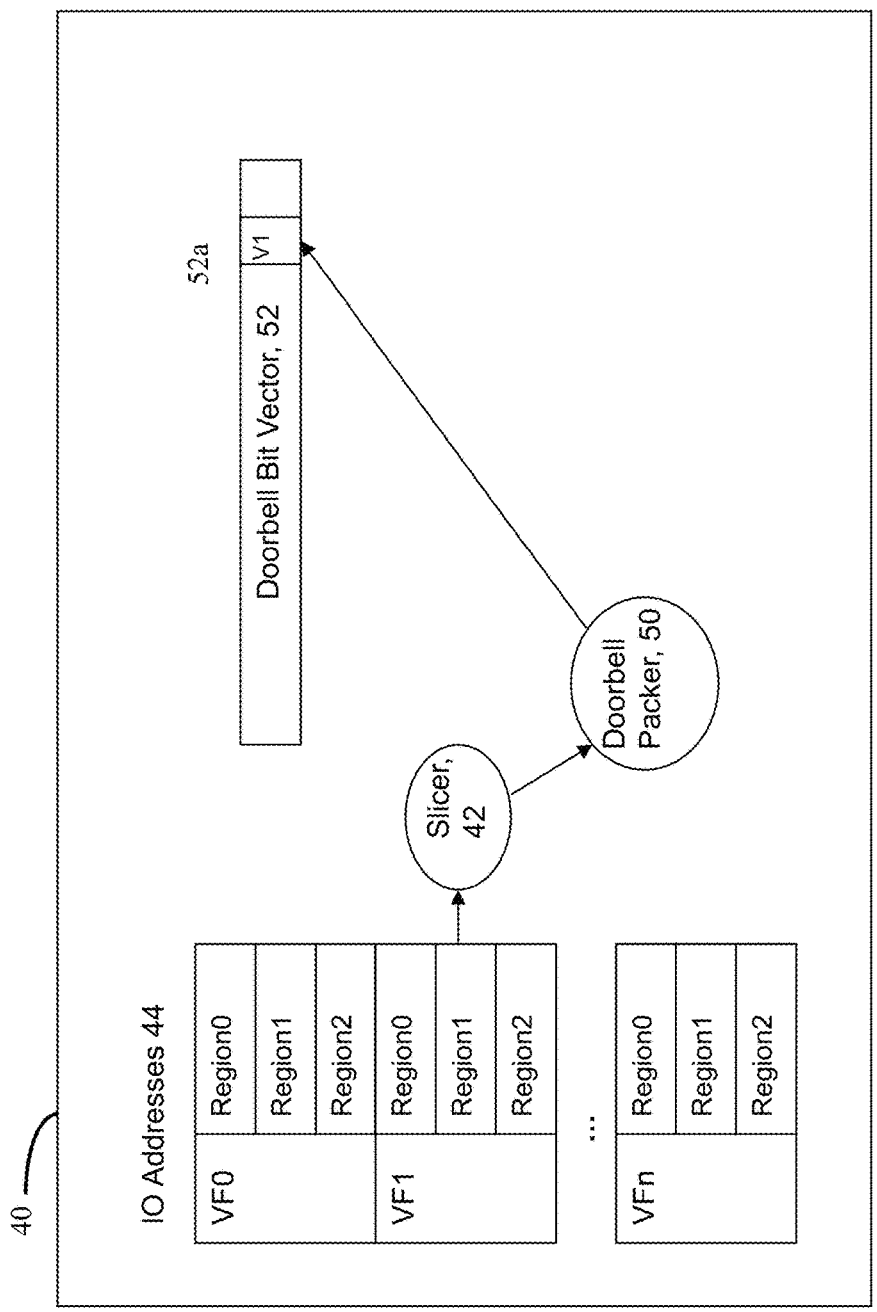
FIG. 3A is a block diagram depicting remapping using a doorbell bit vector.

Referring now to FIG. 3A, "doorbell-interrupt delivery" is similarly aggregated amongst the VFs and packed into the threads. The phrase "doorbell" or "doorbell interrupt" uses a mechanism that allows software to signal or notify a hardware device. Typically, software places data into a well-known, mutually agreed to memory location(s), and "rings the doorbell" by writing a value to a different memory location. This different memory location is generally called the "doorbell region. Multiple doorbells serving different purposes can exist in this doorbell region. The act of writing to the doorbell region of memory "rings the bell" notifying the hardware device that data are ready and waiting in the agreed to memory region.

Interrupt doorbells are produced by mapping one of the regions (for example region2 above) into a special doorbell region 52. This doorbell region is storage that is responsive to a doorbell packer 50 that turns all writes of, e.g., 8 bits or other widths, into single bit writes such as bit 52*a*, which is the doorbell region for V1. By compressing the operation down to 1 bit (e.g., 52*a*) in the doorbell bit vector 52, a host machine's write of 4 or 8 bytes is compressed into the single bit that is packed into the doorbell vector 52 on the IO card 40. Thus software running on the IO card 40 can scan across many such bits (not shown) in the doorbell vector 52 and thus many VFs using efficient bit operations rather than having to scan across separate dedicated memory locations for every VF.

Figure 3B:
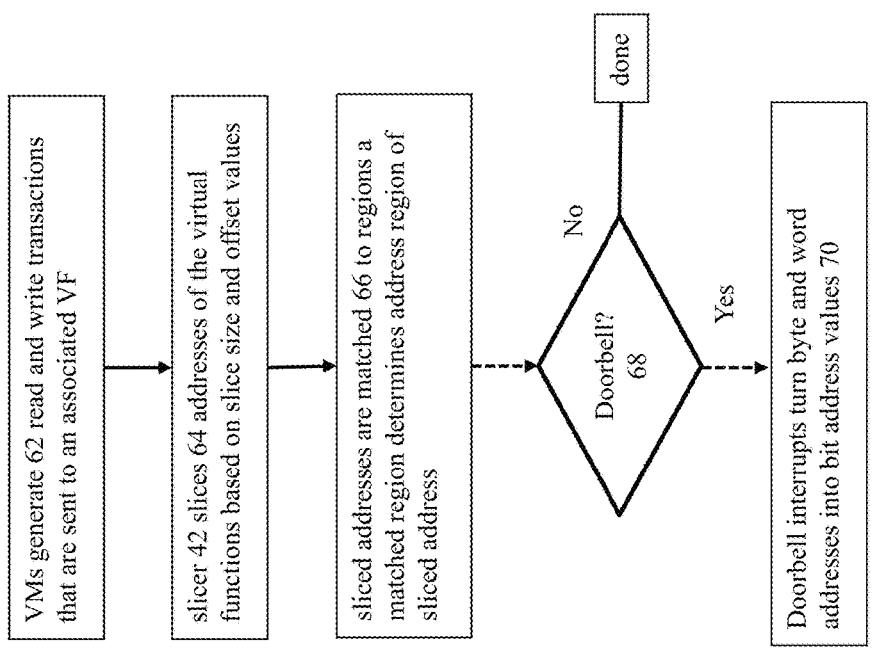
FIG. 3B is a flow diagram depicting remapping.

Referring now to FIG. 3B, remapping 60 is shown. The various VMs generate 62 read and write transactions that are sent to an associated VF on the IO card 40. The slicer 42 slices 64 the addresses of the virtual functions based on a programmable slice size value and offset value (user supplied). The sliced addresses are matched 66 against a set of address regions to determine which address region the sliced address belongs to. Determining 68 the address region that the slice belongs to determines which thread the address belongs to, as well as, access attributes to the region, such as including ordering properties, caching rules, and whether the thread is a doorbell interrupt type. If the thread is not a doorbell process, the remapping 60 is done.

However, for doorbell interrupts, the address is further manipulated 70 to turn 4 and 8 byte (word) addresses into bit addresses. The host processor's VMs word writes end up in packed bit vectors for service by one of the IO card's threads. This thread can quickly scan across hundreds of bits to find those processors that are requesting servicing. Doorbell writes may also be enabled to trigger a local thread interrupt to support interrupt driven doorbell service.

4 Scalable Hardware Bandwidth Management

Described below are techniques for providing Scalable bandwidth management in multi flow packet networks.

Figure 4:
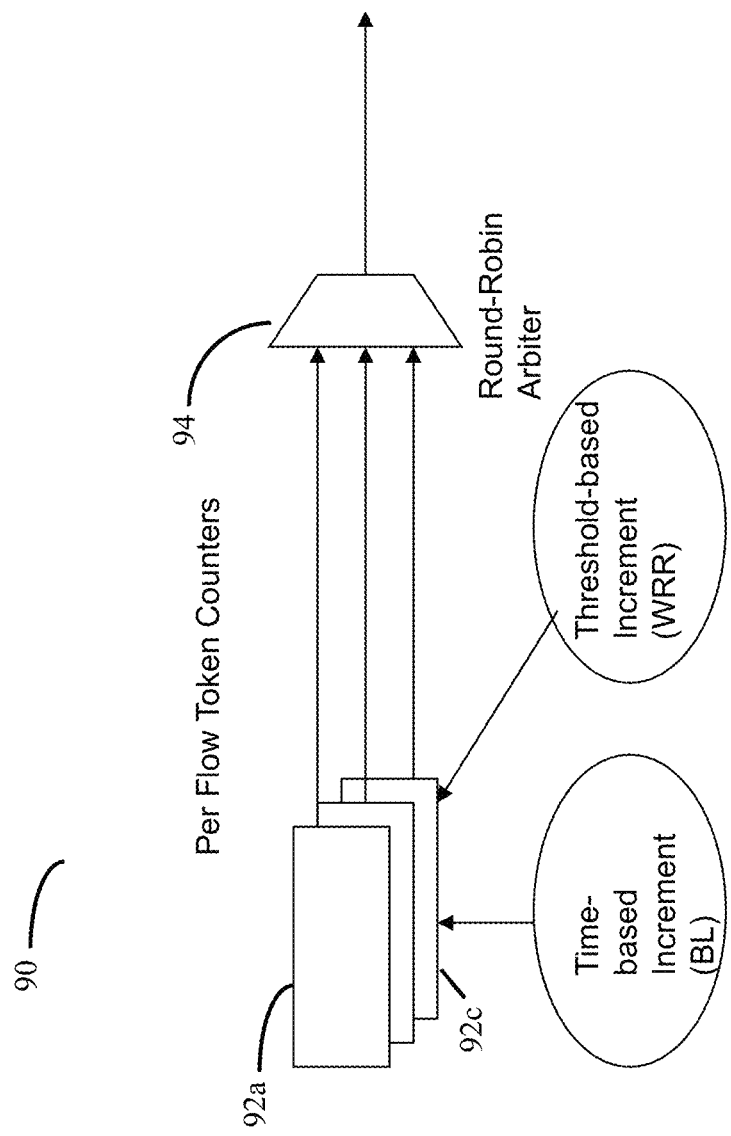
FIG. 4 is a block diagram depicting a fair round robin arbiter.

Referring now to FIG. 4, a technique 90 for packet scheduling, uses a shared token bucket (counter) per flow (three counters 92a-92c shown) for both bandwidth-limited (BL) and weighted round robin (WRR) policy controls. The counts from these counters feed a round robin arbiter 94.

In a traditional token bucket BL scheduler (not shown), bandwidth tokens are added to a counter (not shown) at fixed time intervals and subtracted as bandwidth is consumed. In the traditional token bucket BL scheduler approach, if the counter does not contain sufficient tokens to send a packet, the flow is stalled. In contrast, a weighted round robin (WRR) algorithm, such as "Deficit Round Robin" typically tracks bandwidth use and refreshes tokens one queue at a time, with the refresh rate being based on a flow's ability to send packets.

In FIG. 4, the time based refresh used for BL scheduling and the "availability" based refresh used for WRR scheduling are handled in the same hardware. By combining the time based refresh used for BL scheduling and the "availability" based refresh used for weighted round robin (WRR) scheduling, the same hardware can be efficiently used for both schemes simultaneously.

Figure 4A:
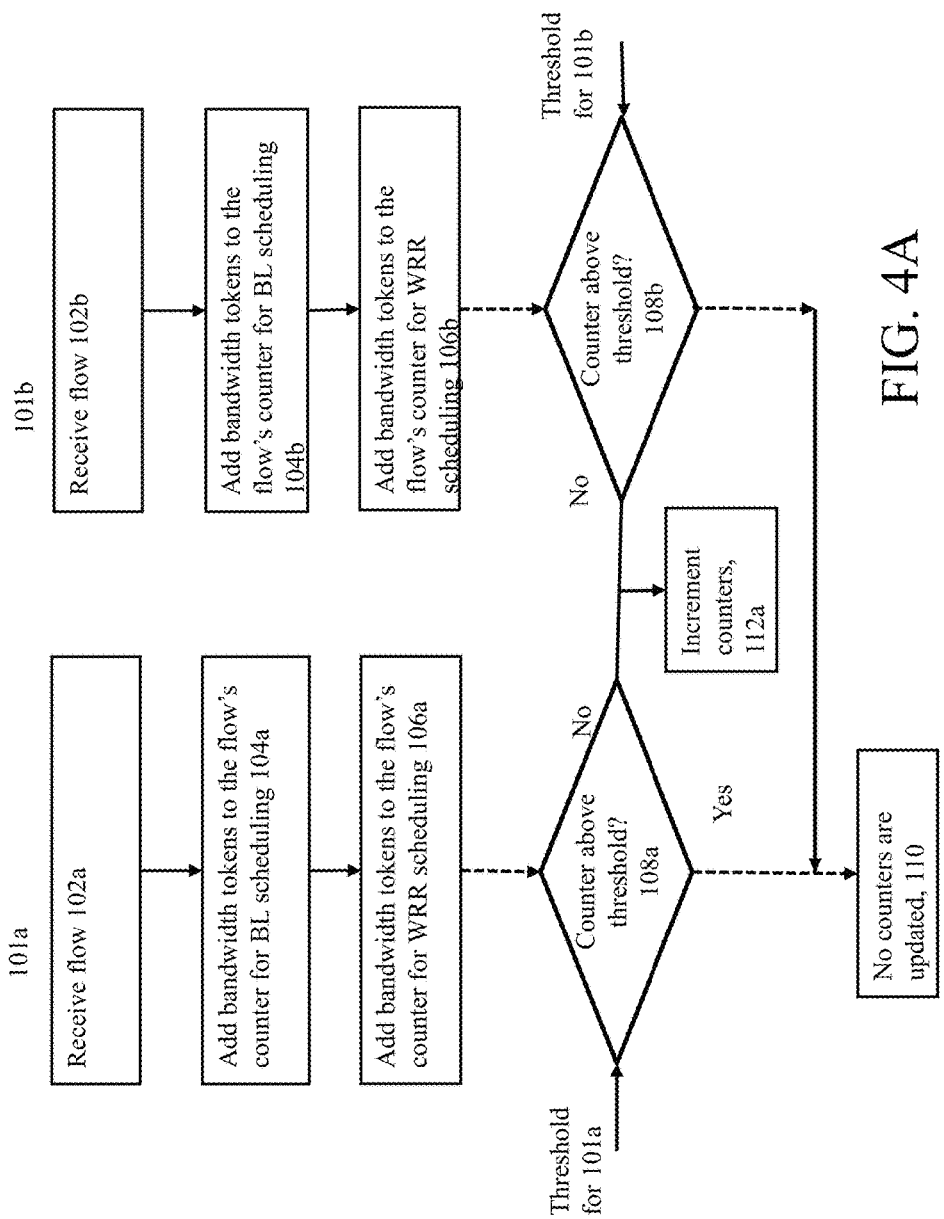
FIG. 4A is a flow diagram depicting flow processing using tokens.

Referring now to FIG. 4A, a process 100 for using token counters for WRR is shown for two flows 101a and 101b. The process 100 involves maintaining a target threshold token count (tokens) for all of the flows' 101a, 101b token counters, e.g., 92a, 92b (FIG. 4). In process 100 there are separate process strings from a flow 101a and a flow 101b. The processing for flows 101a and 101b will be described, noting that many such flows could be present and the processing for such flows would be substantially the same.

The processing for flow 101a receives 102a flows 101a, adds 104a bandwidth tokens to the respective flow's counter for BL scheduling and adds 106a bandwidth tokens to the flow's counter for WRR scheduling. The processing for flow 101a determines 108a if any WRR counter is above an empirical, threshold token count, and if so no counters are updated 110a. If all WRR counters are below the threshold, then all counters are incremented 112a until at least one WRR flow has sufficient tokens to be above the threshold.

The empirical, target threshold prevents counters from saturating at a high value, and thus allows the scheme to dynamically adjust for the ratio of the bandwidths requested for the WRR flows.

The processing for flow 101b receives 102b flows 101b, adds 104b bandwidth tokens to the respective flow's counter for BL scheduling and adds 106b bandwidth tokens to the flow's counter for WRR scheduling. The processing for flow 101b determines 108b if any WRR counter is above an empirical, threshold token count, and if so no counters are updated 110b. If all WRR counters are below the threshold, then all counters are incremented 112b until at least one WRR flow has sufficient tokens to be above the threshold.

As an example, consider three (3) WRR flows: A, B, and C. Flow A is programmed with a threshold value of 10, whereas flows B and C are programmed with a threshold value of 4 each.

A "bursty" implementation could yield the following packet stream:

A-A-A-A-A-A-A-A-A-A-B-B-B-B-C-C-C-C (then repeating)

With the disclosed threshold based WRR technique employing a round robin arbiter, the output will be:

A-B-C-A-B-C-A-B-C-A-B-C-A-A-A-A-A-A (then repeating)

The threshold-based WRR technique will also automatically adjust in the case where no packets are present from flow C and continue to interleave with the reduced burst lengths.

A-B-A-B-A-B-A-B-A-A-A-A-A-A (then repeating)

In FIG. 4, each flow has a token counter 92a-92c, as shown. For BL applications, the counter is refreshed at fixed time intervals (I) with (B) tokens. The (B) token value is programmable on a per flow basis. In this policy, a packet may only be sent if the counter has a count value that is greater than zero. Each time a packet is sent, the counter is decremented by the number of bytes in the packet. Thus, the bandwidth for the flow is (B) bytes/(I) seconds.

For WRR flows, the corresponding flow counter is instead incremented when all other WRR flows to the same output port are below a fixed threshold. The number of tokens added (B) is programmable per flow. When all WRR flows' counters are below a fixed threshold (T), then each counter is incremented by its associated program value (B). WRR flows with larger values of (B) will thus get more bandwidth and the bandwidth for all active WRR flows will match the ratio of their values of (B). A fair round-robin arbiter is used to select either a BL or a WRR packet whose counter is greater than zero. This provides interleaving of packets so that, unlike deficit round robin, the resulting packet stream will be optimally interleaved across all BL and WRR flows.

5 Multi-Processor Communication Using Shared FIFOs and Conditional Atomic Operations Described below are techniques that relate generally to providing efficient peer-to-peer communication through FIFOs by enhancing the FetchAndAdd operation. The FetchAndAdd operation is enhanced by remapping the FetchAndAdd operation to a FetchAndAddIfGreaterThanOrEqualToZero (FetchAddGEZ) conditional atomic operation. This conditional atomic operation allows serialization hardware to conditionally perform the operation based on current memory contents. This operation does not require any modification of existing fabric mechanisms such as those in the above mentioned '927 incorporated by reference application.

Rather, the FetchAddGEZ conditional atomic operation is layered as a service at the sender and receiver peer nodes and is mapped to a specific address or set of addresses. This allows a shared FIFO implementation to be deployed over existing fabrics, e.g., PCI Express or Ethernet, etc., without the need for modifications to the fabric, as long as a receiver node can implement a FetchAddGEZ operation in the receiver memory system.

Figure 5:
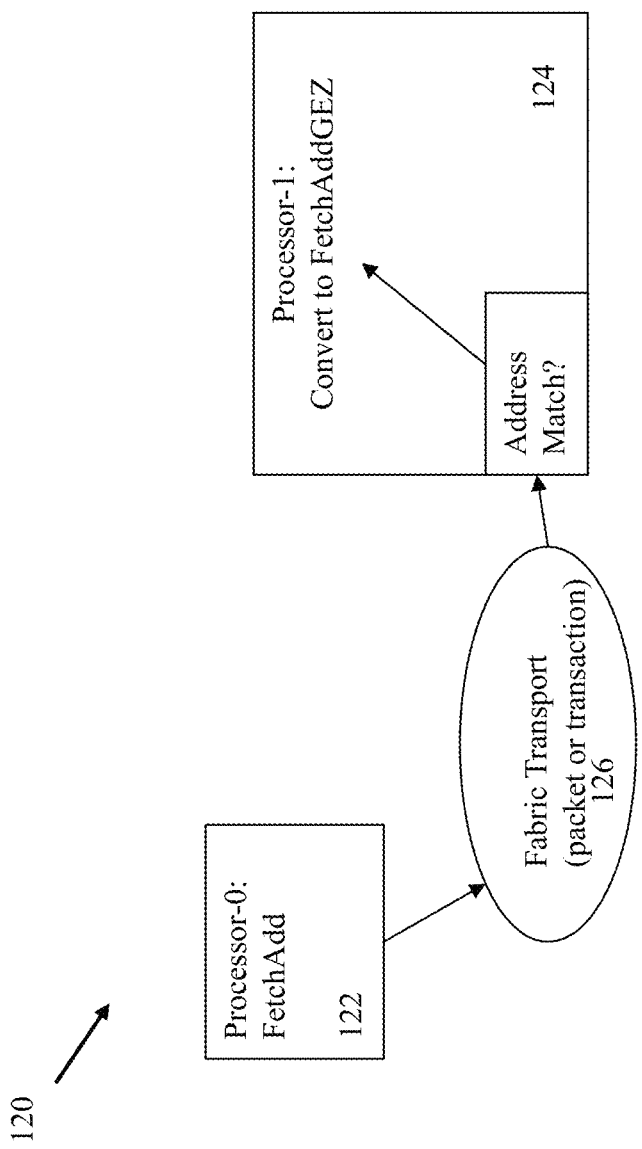
FIG. 5 is a block diagram depicting multi-processor communication using conditional atomic operations.

Referring now to FIG. 5, sender (nodes) 122 and receiver (nodes) 124 (one of each being illustrated) coordinate on a set of FetchAddGEZ memory locations to be used for FIFO controls. When the sender (processor-0) performs a FetchAdd operation, this operation is re-mapped to an associated atomic operation on the fabric transport 126. The receiver (processor-1) 128 atomically converts the remapped operation to a FetchAddGEZ operation.

Figure 5A:
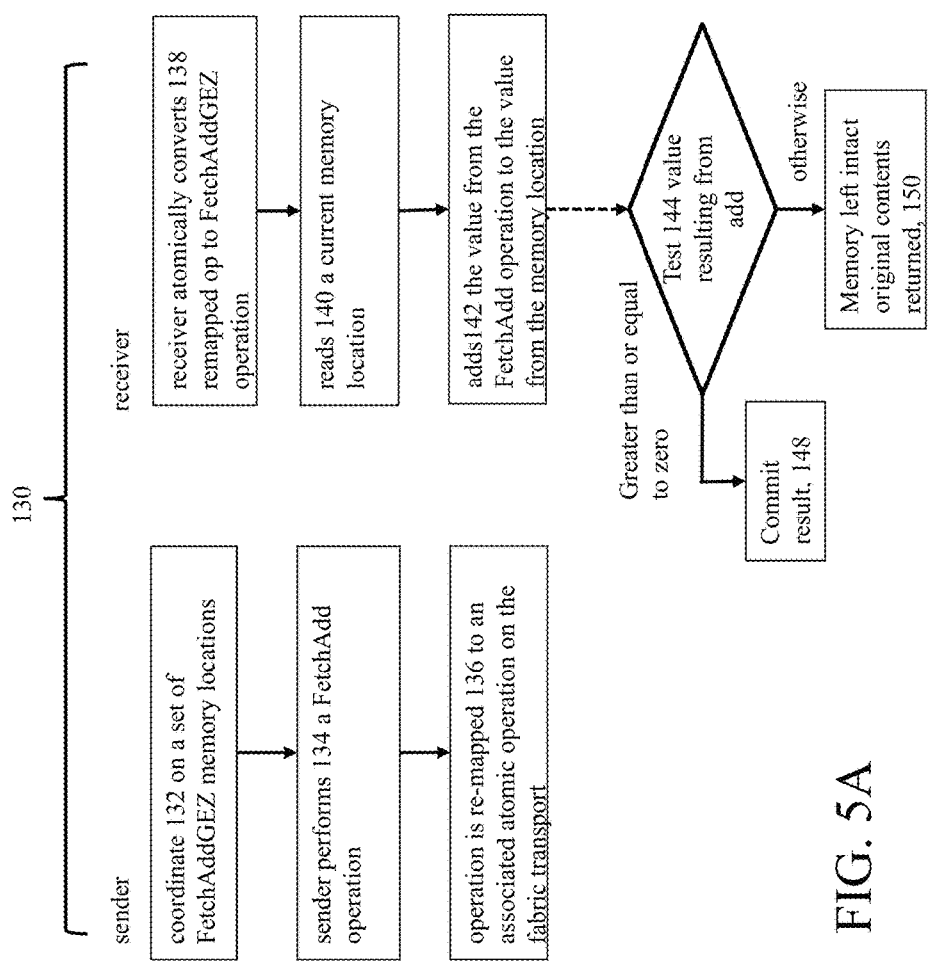
FIG. 5A is a flow diagram depicting remapping the FetchAndAdd operation to a FetchAndAddIfGreaterThanOrEqualToZero.

Referring now to FIG. 5A, remapping 130 of the FetchAndAdd operation is shown. The sender (nodes) 122 and the receiver (nodes) 124 (one of each being illustrated) coordinate 132 on a set of FetchAddGEZ memory locations to be used for FIFO controls. When the sender (processor-0) performs 134 a FetchAdd operation, this operation is re-mapped 136 to an associated atomic operation on the fabric transport 126. The receiver (processor-1) 138 atomically converts the remapped operation to a FetchAddGEZ operation.

The receiver (processor-1) 124 reads 140 a current memory location determined by the coordinated set of memory locations used for the FIFO controls. The receiver (processor-1) adds 142 the value from the FetchAdd operation to the value from the memory location. The receiver (processor-1) tests 144 the value resulting from the add operation. If the result is greater than or equal to zero, the result is committed 148 to memory. Otherwise, if the test fails the memory is left intact and the original memory contents are returned to the sender 150.

6 Programmable Duty Cycle Adjustment Circuit

Figure 6A:
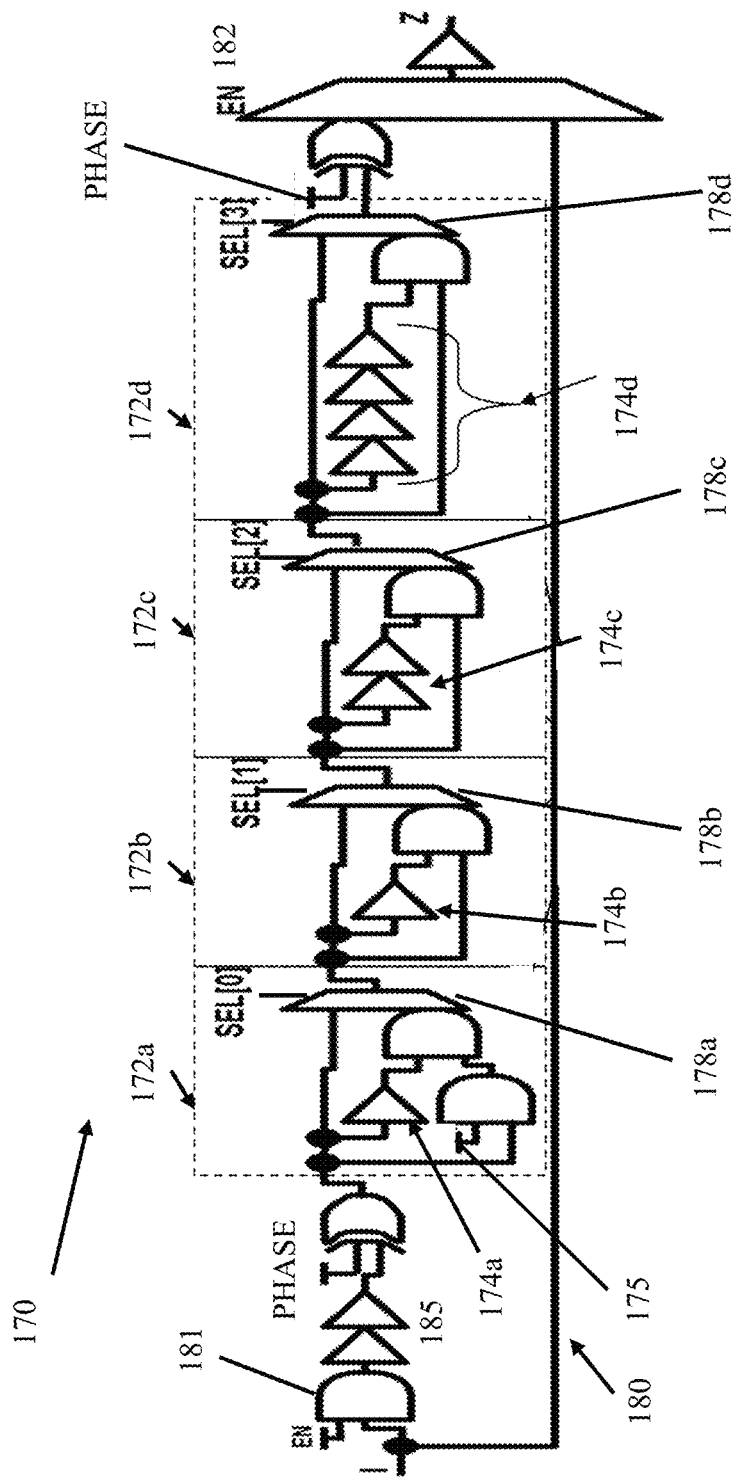
FIGS. 6A-6C are a schematic diagram, a timing diagram and a graph, respectively, of a duty cycle adjustment circuit with leading edge adjustment.
Figure 6B:
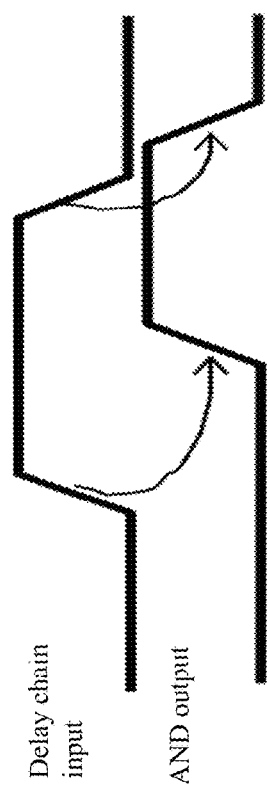
Figure 6D:
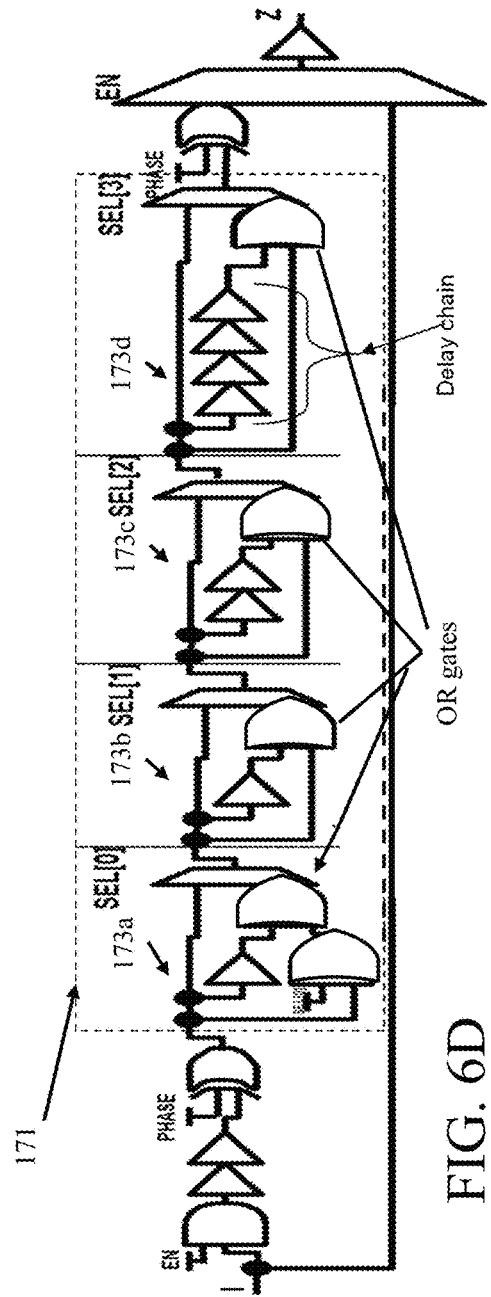
FIG. 6D is a schematic diagram of a duty cycle adjustment circuit with OR gates for trailing edge duty cycle adjustment.
Figure 6C:
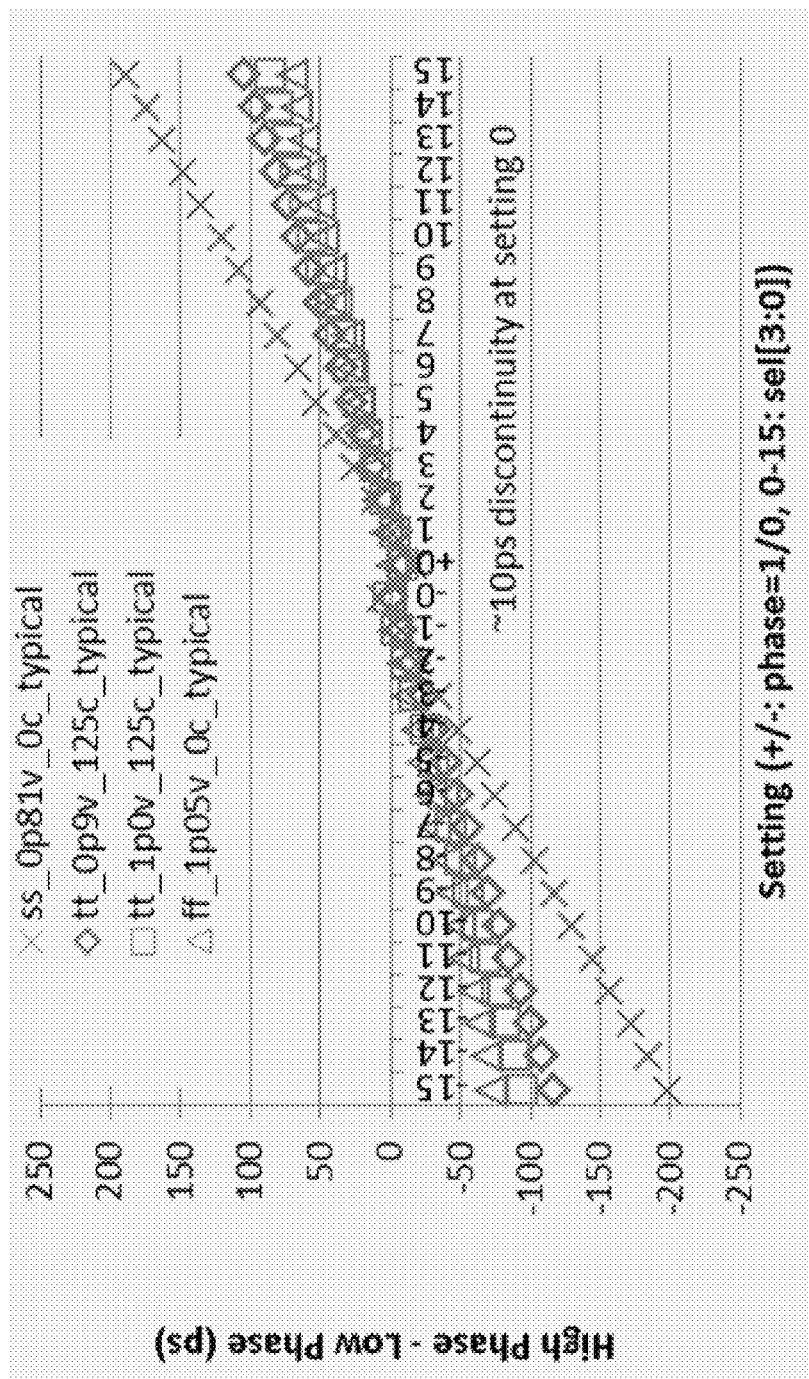

Referring to FIGS. 6A-6C, a programmable duty cycle adjustment circuit 170 that adjusts the duty cycle of an input signal "I" to provide an output signal at "Z" is shown. The programmable duty cycle adjustment circuit 170 includes serial duty cycle adjustment stages 172a-172d, each of which can be selected or bypassed individually. The duty cycle adjustment stages 172a-172d also include respective delay chains 174a-174d.

For example, stages can be selected using a selection bit, e.g. SEL[0], SEL[1], SEL[2], etc., where SEL[0], SEL[1], SEL[2] and SEL[3] control a zero, first, second, and third duty cycle adjustment stage, respectively. The selection bits SEL[0], SEL[1], SEL[2] and SEL[3] control multiplexers 178a-178d. The selection bits can be hardwired or programmably determined.

FIG. 6A illustrates an embodiment with four duty cycle adjustment stages 172a-172d. Any number of duty cycle adjustment stages could be used. The Duty cycle circuit has three serial stages that are built from non-inverting buffers. One stage uses the difference between two gates (a buffer and an AND gate), edge sharpening stages, XORs to selectively invert the signal through the duty cycle adjustment stages, and bypass circuitry.

In order to adjust the duty cycle, a duty cycle adjustment stage applies delay to only one direction of the signal transition. In one embodiment, an AND gate is used to apply the delay only to the rising edge of the input. One input of the AND gate is connected to the output of the delay chain, and the other input is connected to the input of the delay chain.

FIG. 6B illustrates exemplary waveforms at the delay chain input and the AND output. The illustrated waveforms depict how an AND gate applies delay only to the rising edge of a signal and thus adjust the duty cycle of the signal. When the input rises, the output of the AND does not rise until the output of the delay chain rises. However, when the input falls, the output of the AND falls without extra delay (except for a relatively small propagation delay through the AND gate). In this arrangement, the time a signal is high can be reduced by an amount equal to the total delay in the delay chain. In other words, the duty cycle of the signal is decreased. Other similar circuits could be constructed, for example with an OR gate instead of an AND gate to apply delay only to the falling edge of a signal.

Referring back to FIG. 6A, because each stage 172a-172d has a different relative delay between the inputs of the AND gate in that stage, each stage applies a different amount of duty cycle adjustment to the signal.

In FIG. 6A, in the stages controlled by SEL[1], SEL[2], and SEL[3], use the delay chains 174a-174d to provide the relative delays. The delay chains are of a single type of unit delay cell, such as non-inverting buffers, as shown that are instantiated serially in different lengths for different stages. The lengths are powers of 2, e.g. 1, 2, 4, 8, etc. The signal path through the entire duty cycle circuit can be configured to include any integer number of unit delay cells, from 0 to $(2^{N-1})$, where N is the number of serial delay chains. An advantage in using powers of two for the lengths is that it minimizes the number of stages and selection bits required to provide a certain number of configurations, without requiring any additional decoder logic. Another advantage of this approach is that even if the exact delay of the unit delay cell is unknown, for example due to systematic layout-based process variations, the total number of possible duty cycle adjustment settings remains constant and evenly distributed.

To maximize robustness, the unit delay cell is chosen so as to keep the edge rates as stable as possible. Ideally, the unit delay cell should also exhibit similar sensitivities to process variation, voltage, temperature, and other parameters as other cells used elsewhere in the timing paths. This can be achieved in practice by selecting a frequently used cell from a standard cell library used for the logic, especially one that is similar in layout style, threshold voltage, channel length, and other parameters to other standard cells. Due to the nature of the circuit, a non-inverting cell is preferred; however an even combination of inverting elements could be used to produce a non-inverting cell.

In addition, a non-inverting logic gate such as an AND gate could be used, with one input tied to the selection bit for the stage. This configuration prevents unnecessary switching in the delay chain when the chain is not being used, which reduces power. The tradeoff is that the delay of logic gates is longer than that for a buffer, and may be longer than desired.

If the delay of the unit delay cell is larger than the desired resolution for duty cycle control, a smaller duty cycle adjustment can be produced using the relative difference of two paths.

In the example illustrated in FIG. 6A, in the stage controlled by SEL[0], the delay chain 174a is provided by relative timing differences between the inverter and the AND gate. In this configuration, one input to the AND gate has a single buffer and the other input has a second AND gate, with one input to the second AND gate either logically high or connected to SEL[0]. A connection 175 to SEL[0] prevents the AND gate from switching when the stage is not selected. In this example, the buffer and AND gate were chosen because the AND gate delay is approximately 1.5 times the delay of the buffer. The relative timing difference of a rising signal vs. a falling signal is approximately one half the delay of the unit delay cell, so this stage provides a duty cycle adjustment of one half the adjustment of the stage controlled by SEL[1]. Accordingly, any combination of gates could be used to produce such relative delay, so long as the relative delay is about half the delay of the unit delay cell used in the other delay chains.

One set of duty cycle adjustment stages is used both to increase and to decrease the duty cycle. An XOR gate is inserted before and after the duty cycle adjustment stages, 172a-172d with one input connected to a "PHASE bit", which indicates whether the duty cycle adjustment is positive or negative. When the PHASE bit is high, the XORs invert the signal only through the duty cycle adjustment stages. The duty cycle of the signal in those stages is decreased by the use of AND gates, but when the signal is inverted back, the output has an increased duty cycle. This approach has significantly better power and area efficiency than using separate chains for each direction.

It is possible to have a different duty cycle adjustment when no duty cycle stages are selected, i.e., SEL=0, depending on the setting of PHASE. This arises because of small imbalances in the rise and fall delays of the gates in the circuit, such as the multiplexers, the XORs, and other gates in the circuit 170. The delays can be minimized with several techniques, such as selecting gates that are well balanced, using an even number of like gates in the chain (for example, in FIG. 6A there are two XORs, two edge sharpening stages, and 4 duty cycle stages). These techniques may not completely eliminate the difference in duty cycle adjustment, though, especially when process variations are present.

To ensure that the full range of duty cycle adjustment is achievable, it is preferable to leave a small offset in duty cycle adjustment, such that the duty cycle with SEL=0 and PHASE low is slightly greater than the duty cycle with SEL=0 and PHASE high.

Referring now to FIG. 6C, simulated effects on the duty cycle for different settings of SEL and PHASE, with an offset of 10 ps (picoseconds $10^{-12}$) is shown. Various process, voltage, and temperature (PVT) corners are simulated, illustrating a linear, evenly distributed output for each setting of PHASE, even though the delay of the unit delay cell is different in each PVT. In FIG. 6C, the output response of the duty cycle circuit is illustrated showing a range of adjustment that can be achieved, with uniform distribution of settings, and a small degree of overlap around 0.

In FIG. 6A, a small number of edge sharpening stages 185 precedes the first duty cycle adjustment stage. The edge sharpening stages 185 are cells such as the unit delay cell that tend to modify the edge rate of a signal to some reasonably sharp intrinsic value. This decreases the uncertainty in the edge rate of the signal at the start of the delay chains. Because the delays of later cells depend on the edge rates of their inputs, the edge sharpening stages 185 also provide increased robustness and decreased sensitivity for the duty cycle adjustment of the entire circuit.

Bypass circuitry 180 is added to the circuit 170 in the form of an AND gate 181 at the input and a connection to a multiplexer 182 at the output that are controlled by a one bit signal named EN. When EN is high, the input signal is propagated through the duty cycle adjustment stages and to the output Z. When EN is low, the AND gate blocks the duty cycle adjustment stages from switching, thereby saving power, and the multiplexer passes the input I directly to the output Z.

The duty cycle adjustment circuit 170 can be used independently or in conjunction with other circuits to modify signal characteristics, for example a delay circuit. When used in combination, the circuits are connected serially, but can be in any order. If the circuits have similar characteristics, for example if they both use delay chains with a common unit delay cell, they will have similar sensitivities to PVT, and may be calibrated to work together, for example to match rising edges even if their duty cycles are different.

Referring now to FIG. 6D, a duty cycle adjustment circuit 171 with OR gates for trailing edge duty cycle adjustment is shown. This circuit includes four staged 173a-173d and with each stage including an OR gate in place of the AND gate of the circuit 170 (FIG. 6A). Other circuits shown in FIG. 6D are similarly used in the circuit 171 and are not described for brevity.

7 Programmable Delay Circuit

Figure 7A:
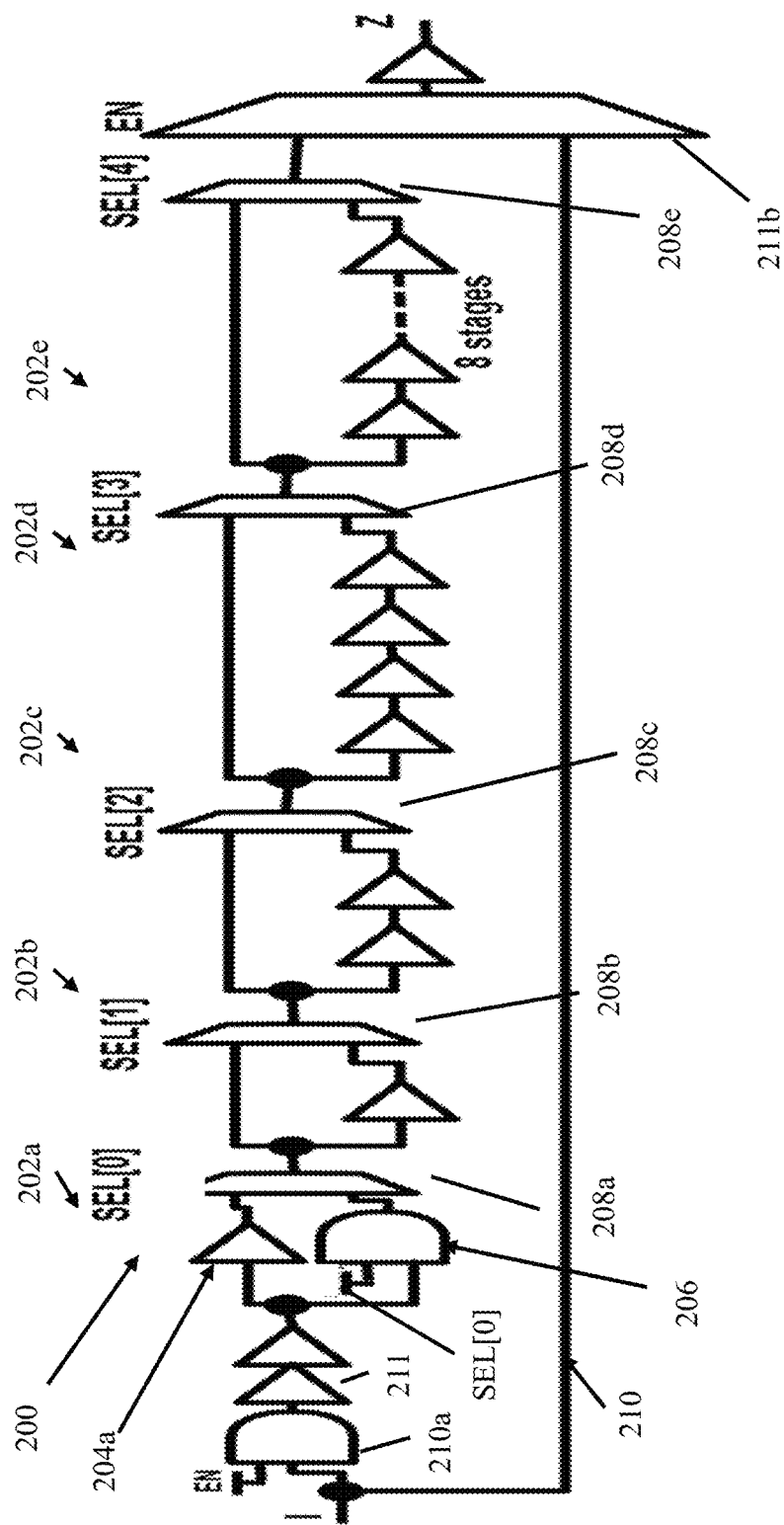
FIGS. 7A, 7B are a schematic diagram and a timing diagram, respectively, of a delay circuit.

Referring now to FIG. 7A, a programmable delay circuit 200 is shown. FIG. 7A shows the delay circuit 200 with five serial delay chains 202a-202e, four of which are provided by non-inverting buffers (generally 204). One delay chain 202a uses a delay difference between two gates (a buffer 204a and an AND gate 206) to produce a sub-incremental delay value. Also shown are edge sharpening stages 211 and bypass circuitry 210. The delay circuit 200 is programmable through selection of serial delay chains 202a-202d by a signal. Each of the serial delay chains 202a-202d can be either selected or bypassed individually using a selection bit, e.g. SEL[0], SEL[1], SEL[2], SEL[3], etc., where SEL[0], SEL[1], SEL[2], SEL[3], and SEL[4], control the first, second, third, fourth and fifth delay chains, respectively, via multiplexers 208a-208e. The chains include a single type of unit delay cell, such as the non-inverting buffer (generally 204) that is instantiated serially in different lengths. Exemplary lengths are powers of 2, e.g. 1, 2, 4, 8, etc. The signal path through the circuit can be configured to include any integer number of delay cells, from 0 to ($2^{N-1}$), where N is the number of serial delay chains.

FIG. 7A illustrates such a circuit 200 with four such delay chains 202b-202e provided from buffers, controlled by SEL [1] to SEL[4]. However, any number of duty cycle adjustment stages could be used. An advantage in using powers of two for the lengths is that it minimizes the number of stages and selection bits required to provide a certain number of configurations, without requiring any additional decoder logic. A second advantage of this approach is that even if the exact delay of the unit delay cell is unknown, for example due to systematic layout-based process variations, the total number of possible duty cycle adjustment settings remains constant and evenly distributed. This advantage is useful for modifying the relative timing of two paths when the delay circuit is included in both paths, for example, at the endpoints of a launch and capture clock. In this case, the common elements of both paths, for example, the multiplexers, edge sharpening stages, and bypass circuitry in the delay circuit, as well as, any systematic layout-based process variations affecting them, do not contribute significantly to the relative timing of the paths. Instead, the relative timing is substantially controlled by the difference in the number of delay cells configured for each path.

To maximize robustness, the unit delay cell should also be chosen so as to keep the edge rates as stable as possible. Ideally, the unit delay cell should also exhibit similar sensitivities to process variation, voltage, temperature, and other parameters as other cells used elsewhere in the timing paths. This can be achieved in practice by selecting a frequently used cell from a standard cell library used for the logic, especially one that is similar in layout style, threshold voltage, channel length, and other parameters to other standard cells.

Due to the nature of the circuit 200, a non-inverting cell 204 is preferred; however an even combination of inverting elements could be used to produce a non-inverting cell. Moreover, a non-inverting logic gate such as an AND gate could be used, with one input tied to the selection bit for the stage. This configuration prevents unnecessary switching in the delay chain when the chain is not being used, which reduces power. The tradeoff is that the delay of logic gates is longer than that for a buffer, and may be longer than desired.

If the delay of the unit delay cell is larger than the desired resolution for delay cell control, a smaller delay can be produced using the relative differences in the delay circuits when disposed in each of two paths as shown for stage 202a. In the example illustrated in FIG. 7A, a multiplexer controlled by SEL[0] selects either a path with a single buffer's delay or a path with the delay of an AND gate. In this example, the buffer 204a and "AND" gate 206 are chosen because the AND gate delay is approximately 1.5 times the delay of a buffer. To generate a relative timing difference of approximately one half the delay of a buffer, in one path SEL[0] is set so that the path goes through the AND gate, and in the other SEL[0] is set oppositely so that the path goes through the buffer. Any combination of gates could be used to produce this relative delay, so long as the relative delay is about half the delay of the unit delay cell used in the other delay chains.

As shown in FIG. 7A, a small number of edge sharpening stages 211 precedes the first delay chain. The edge sharpening stages 211 are cells such as the unit delay cell that tends to modify the edge rate of a signal to some intrinsic value. This decreases the uncertainty in the edge rate of the signal at the start of the delay chain. Because the delays of later cells depend on the edge rates of their inputs, the edge sharpening stages 211 also provide increased robustness and decreased sensitivity for the delay of the total chain.

Bypass circuitry 210 is added to the circuit in the form of an AND gate 201a at the input and a path coupled to a multiplexer 210b at the output, which are controlled by a bit signal "EN." When EN is high, the input signal is propagated through the delay chains and to the output Z. When EN is low, the AND gate blocks the delay chains from switching, thereby saving power, and the multiplexer passes the input I directly to the output Z.

Figure 7B:
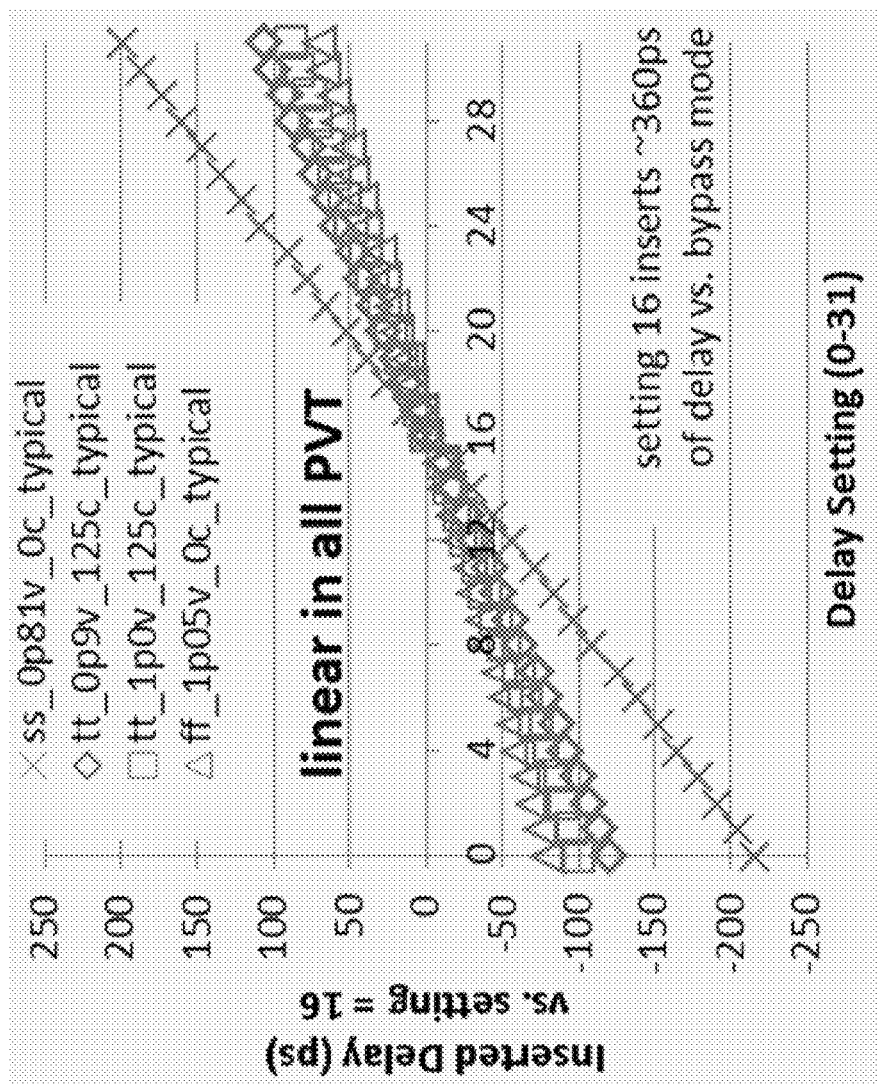

Referring to FIG. 7B, the output of the delay circuit 200 using a setting of SEL=16 as a normalization point is shown. FIG. 7B shows an output of the delay circuit illustrating a linear response among all PVT variations. That is, various process, voltage, and temperature (PVT) corners are simulated, illustrating a linear, evenly distributed output, even though the delay of the unit delay cell is different in each case.

The delay circuit 200 can be used independently or in conjunction with other circuits to modify signal characteristics, for example a duty cycle adjustment circuit. When used in combination, the circuits are connected serially, but can be in any order. If the circuits have similar characteristics, for example if they both use delay chains with a common unit delay cell, they will have similar sensitivities to PVT, and may be calibrated to work together, for example to match rising edges even if their duty cycles are different.

8 Mechanism to Avoid Load Stalls with in-Order Execution Processors

Referring now to FIGS. 8A-F, new instruction operations are illustrated that can be used to avoid many instructions stalls and effectively reap processing benefits that accompany out of order and speculative execution processors without significant increase of hardware and/or hardware complexity. These new instructions when added to an in order processor architecture enable such processors to potentially execute additional instructions during instruction loads, much like out-of-order execution and speculative execution processors, but with a lower hardware cost.

That is, the addition hardware required for implementing these new instructions is generally much less than the typical hardware required for implementing out-of-order execution and speculative execution processors. In the examples below, previous instructions can be load instructions that the core marks corresponding ready bits as ready bits when the destination register of the load has the value returned from memory. The hardware to implement these new instructions below accesses register ready bits that are already stored by the processor.

BRANCH_READY <branch-target> <Register N>

Referring to FIG. 8A, the "BRANCH_READY" instruction 250 includes a target instruction <branch-target> e.g., the instruction that the instruction will branch to if taken and a register location <Register N> that is the register that has the Ready bit. This instruction operates as follows; a previous instruction is executed, 252, "Register N" is tested to determine 254 whether or not the Ready bit in Register N indicates that operands are ready. If Register N is ready (i.e., using the value in register N would not stall instruction execution) the BRANCH_READY instruction branches 258 to the <branch-target> instruction. Otherwise, 256 if Register N is not ready, no branch is taken and execution continues to the next instruction in the current instruction stream.

BRANCH_NOT_READY <branch-target> <Register N>

Referring to FIG. 8B, the "BRANCH_NOT_READY" instruction 260 includes a target instruction <branch-target>, e.g., the instruction that the instruction will branch to if the branch is taken and a register location <Register N> that is the register that has the Ready bit. This instruction operates as follows; a previous instruction is executed 262, "Register N" is tested to determine 264 whether or not the Ready bit in Register N indicates that operands are not ready (i.e., using the value in register N would stall instruction execution), the BRANCH_NOT_READY instruction branches 266 to the <branch-target> instruction. Otherwise, if Register N is ready, no branch is taken 268 and execution continues to the next instruction in the current instruction stream.

SELECT R1, R2

Figures 8C, 8D:
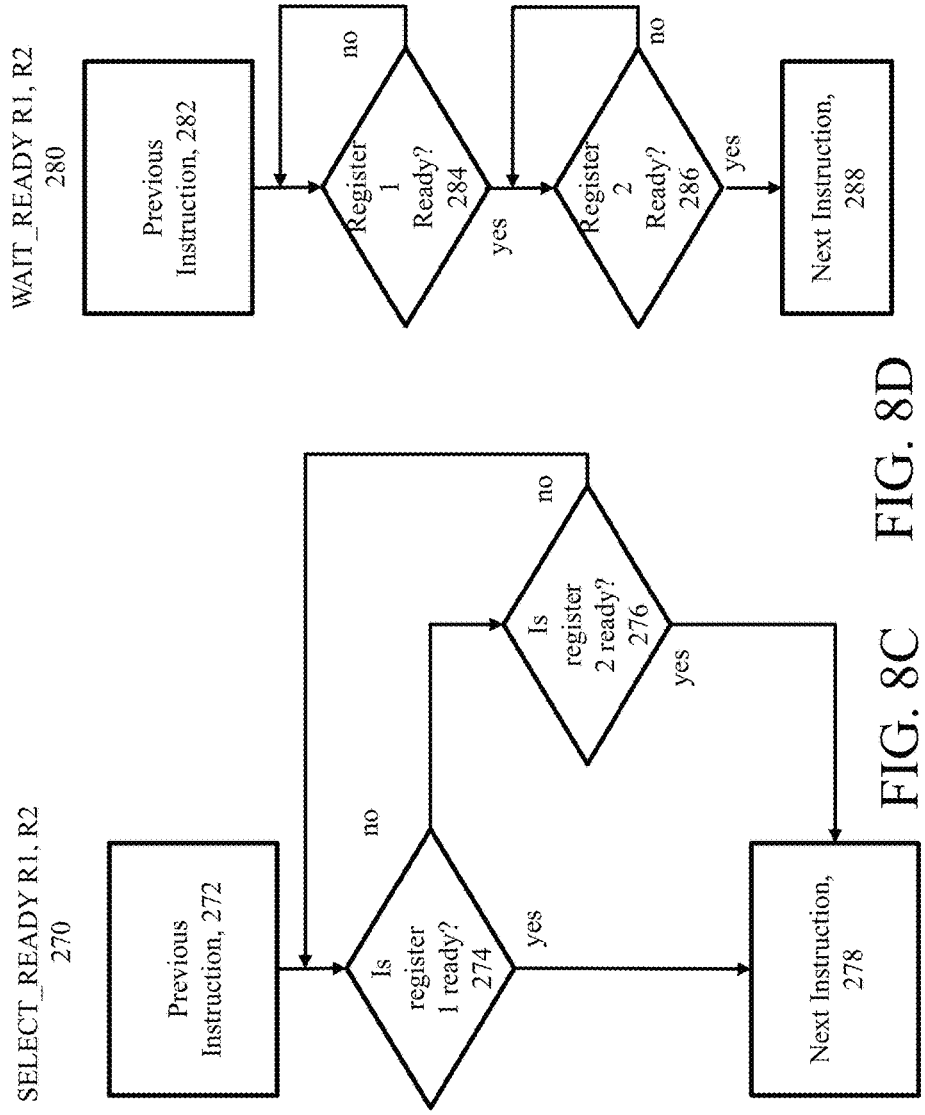

Referring now to FIG. 8C, a "SELECT R1, R2" instruction 270 has as operands two registers, R1 and R2. This instruction operates as follows; a previous instruction is executed, 272, "R1" (Register 1) is tested to determine 274 whether or not the Ready bit in Register 1 indicates that operands are ready. If Register 1 is ready (i.e., using the value in register 1 would not stall instruction execution) the next instruction is executed 278. Otherwise, if R1 is not ready, "R2" "Register 2" is tested 276. If Register 2 is ready (i.e., using the value in register 2 would not stall instruction execution) the next instruction is executed 278. Otherwise, if R1 is not ready, "R2" "Register 1" is tested. That is, if either register R1 or R2 is ready the instruction stream continues executing. However, if both registers are not ready, execution of the instruction stream stalls at the "SELECT R1, R2" instruction until at least one of R1 and R2 is ready.

WAIT_READY R1, R2

Referring now to FIG. 8D, a "WAIT_READY R1, R2" instruction 280 has as operands two registers, R1 and R2. This instruction operates as follows; a previous instruction is executed, 282, "R1" (Register 1) is tested to determine 284 whether or not the Ready bit in Register 1 indicates that operands are ready. If Register 1 is ready (i.e., using the value in register 1 would not stall instruction execution) "R2" "Register 2" is tested 286. If Register 2 is ready (i.e., using the value in register 2 would not stall instruction execution) the next instruction is executed 288. Otherwise, if either R1 or R1 is not ready, the instruction stalls at either test of R1 or R2. That is, if both registers R1 and R2 are ready the instruction stream continues executing. However, if one or both registers are not ready, execution of the instruction stream stalls at the "WAIT_READY R1, R2" instruction until both of R1 and R2 are ready.

SELECT_MASK Rn

Referring now to FIG. 8E, a "SELECT_MASK Rn" instruction 290 has as an operand register, Rn. This instruction operates as follows; a previous instruction is executed, 292, "Rn" (Register n) is used as a bit mask for registers. The value in Rn is tested to determine 294 whether or not any register specified by the bit mask is ready (i.e., using any of the values in Rn would not stall instruction execution). If any register specified by the bit mask is ready, the instruction stream continues executing using the register specified. Otherwise, if all of the registers specified by the bit mask are not ready, instruction execution stalls at this instruction until at least one register specified by the bit mask in Rn is ready. That is, register Rn stores a bit mask with bits associated with specific registers, and if any register specified by the bit mask is ready, the instruction stream continues execution, otherwise, the instruction stream stalls until at least one register is ready.

WAIT_READY_MASK Rn

Referring now to FIG. 8F, a "WAIT_READY_MASK Rn" instruction 300 has as an operand register, Rn. This instruction operates as follows; a previous instruction is executed, 302, "Rn" (Register n) is used as a bit mask for registers. The value in Rn is tested to determine 304 whether or not all registers specified by the bit mask are ready (i.e., using all of the values in Rn would not stall instruction execution). If all registers specified by the bit mask are ready, the instruction stream continues executing using the next instruction. Otherwise, if all of the registers specified by the bit mask are not ready, instruction execution stalls at this instruction until all registers specified by the bit mask in Rn are ready. That is, register Rn stores a bit mask with bits associated with specific registers, and if all registers specified by the bit mask are ready, the instruction stream continues execution, otherwise, the instruction stream stalls until at all registers are ready.

The hardware to implement the above new instructions, uses the register ready bits that are already stored by the processor to indicate if the branch should be taken or not.

Below is an example of how the new instructions can be used in a program to reduce latency. The optimization set out below is accomplished by the new instructions, despite the inability of a compiler to predict which register loads will complete first.

In this example, the structures pointed to by P and Q will take different amounts of time to load. If q→next arrives quickly, but p→next takes longer, the second load of q→next→a is blocked waiting for p→next to return. By using the SELECT and BRANCH_READY instructions, the order of loading p→next→a and q→next→q can be changed such that the first one to be ready is loaded first.

The function follow_links( ) below shows how the new instructions can be used to reduce the total time to execute the program.

```
struct foo { int a; struct foo * next;}
int follow_links(struct foo *p, struct foo *q)
{
    struct foo *X, *Y;
    X = p->next;
    Y = q->next;
    return X->a + Y->a;
}
int basic_follow_links(struct foo *p, struct foo *q)
{
    struct foo   *np, *nq;
    p = p->next;
        nq = q->next;
        int pa = np->a;
        int qa = nq->a;
        return pa + qa;
}
```

The sample function "follow_links( )" above does not use any of the disclosed new instructions.

```
int better_follow_links(struct foo *p, struct foo *q)
{
    struct foo   *np, *nq;
    int pa, qa;
    np = p->next;
    nq = q->next;
    select_any(np, nq);   // Wait for either np or nq to
    be ready. Stall if neither ready.
    if (ready(np) ) {
        pa = np->a;
        qa = nq->a;
    } else {
        qa = nq->a;
        pa = np->a;
    }
    return pa + qa;
}
```

In the above example, the instruction select_any(np, nq) (e.g., SELECT R1, R2) is used, which means that the instruction waits for either np or nq to be ready or otherwise stalls if neither is ready.

Figure 9:
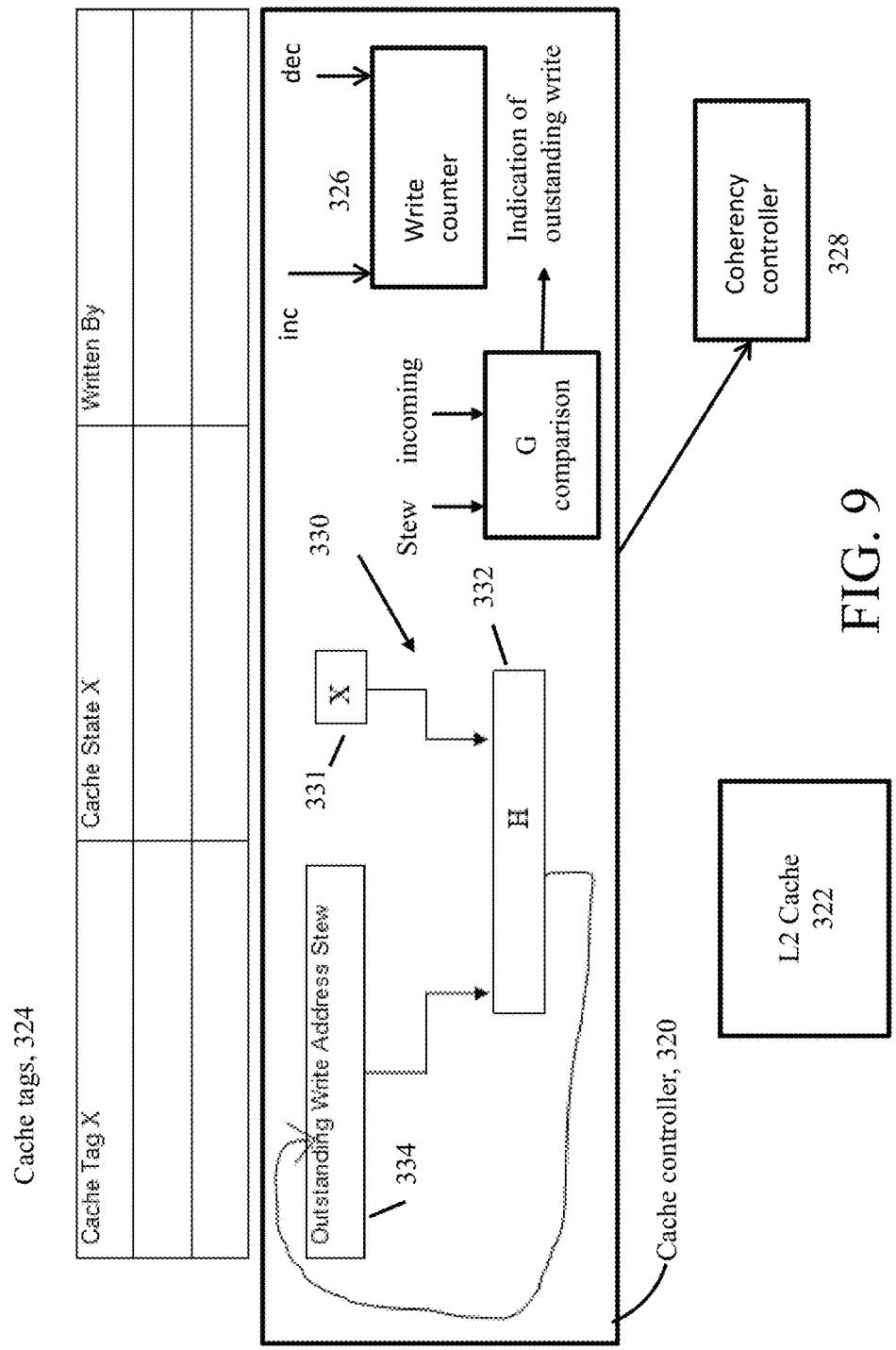
FIG. 9 is a diagram depicting cache controller operation.

9 Managing Memory Ordering and Coherence in Hierarchical Shared-Cache Multicore Processors Referring now to FIG. 9, a cache controller 320 is shown. Writes executed by a processor core 3 (FIG. 1B) that hit in a shared L2 cache 320 are tracked by the cache controller using L2 cache tags 324. The cache tags 324 include a set of cache tag values, cache state values, and values indicating written by core. The cache controller 320 includes an outstanding write counter 326 that is incremented each time a write hit occurs and a write through instruction carrying the address and data is sent to the next level cache (not shown) or coherence controller 328 and the outstanding write counter 326 is decremented as writes are acknowledged by the next-level coherence controller 328. Reads from other processor cores in a cluster (two or more processors cores and a cache bank referred to hereafter as a cluster) check to see if the cache block has been written by another core in the cluster. If the cache block has been written by another core, the cache controller will invalidate the cache block and force the read to get the data from the next-level cache. This "forced invalidate" and subsequent reading from the next level cache adds latency to the request and lowers overall program performance.

An address hashing scheme 330 using the write addresses is employed to reduce the frequency of these "forced invalidates." A hash function "H" 332 is used to produce an N-bit compressed representation of the write addresses that have been sent to the coherence controller 328. The resulting set of N bits is referred to as the "outstanding write address stew" (or just "stew") 334. The hash function is provided such that the resulting stew is conservative. If address X has been sent to the coherence controller 328 and has been mixed into the stew 334, and a new read request for address X arrives, a comparison function (G) indicates that there could be an outstanding write to X. The stew is cleared whenever the outstanding write counter clears to zero.

Figures 1, 2, 9A:
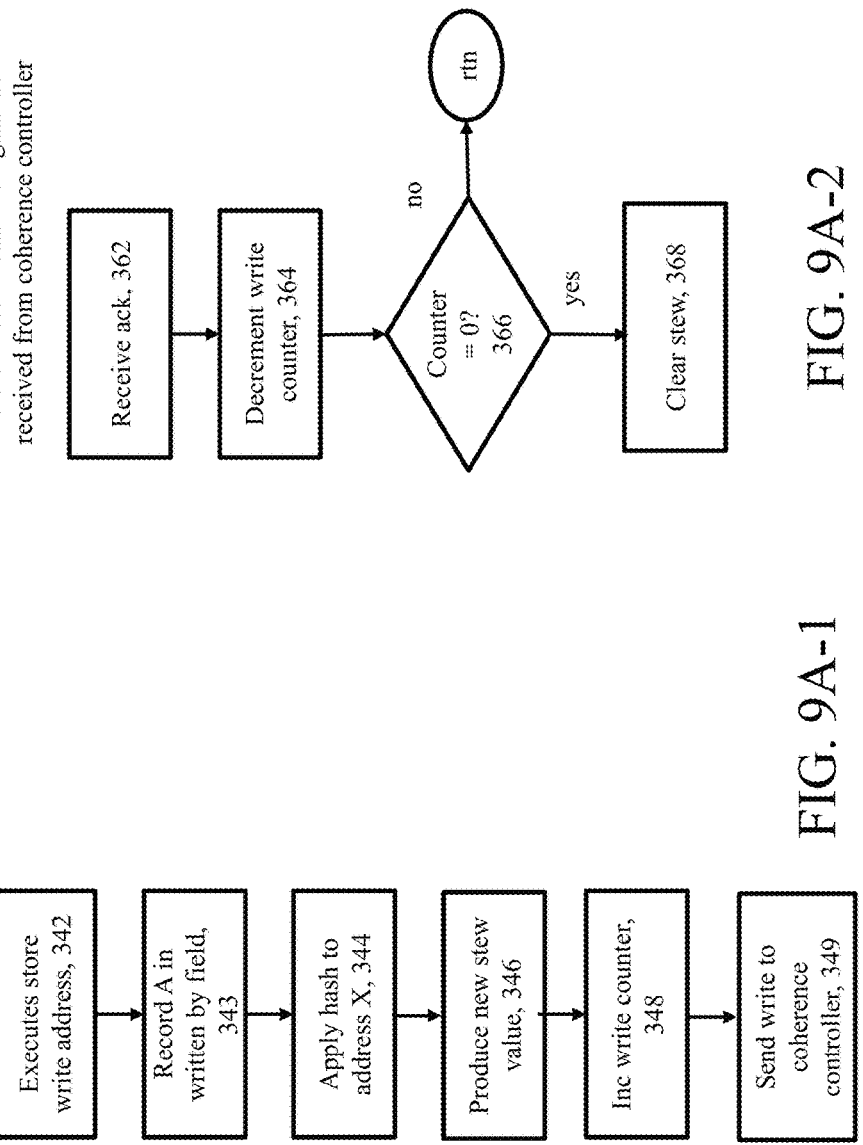

Referring now to FIG. 9A-1, an overall process flow 340 for an initial write hit to cache block X by processor A is shown. In this process 340, processor A executes 342 store address X, hits in shared cache, the cache controller records 343 "A" in the "written by" tag field for cache block X, the cache controller applies hashes to address X into the "outstanding write address stew" and a new stew value is produced as H (old stew, X). The cache controller increments the "outstanding write counter" and the cache controller sends the write to the coherence controller.

Referring now to FIG. 9A-2, an overall process flow 360 for a write acknowledgement received from coherence controller (where the address is unknown) is shown. The process flow 360 receives an ack. 362, decrements 364 the outstanding write counter, and if the outstanding write counter equals 0 366, the process 360 clears 368 the outstanding write address stew.

Referring now to FIG. 9A-3, an overall process flow 370 for a read request that hit on a cache block X from processor B is shown. The process flow 370 reads 372 the hit and "written by" field!=B. If address stew==0, 374 the process flow satisfies 376 the read request and clears 378 the "written by" tag field for cache block X. However, if address stew!=0, 380, the process flow 370 applies 382 the comparison function G(stew, X) and if the comparison indicates 384 that there could be an outstanding write to X, then the process flow 370 invalidates 386 block X and sends 390 the read(X) request to the coherence controller. If the comparison function indicates that there cannot be an outstanding write to X, then the process flow 370 satisfies 376 read and clears 378 the "written by" tag field for cache block X.

Referring now to FIG. 9A-4, an overall process flow 400 for a read hit and "written by" field B is shown. When a read hit occurs at a cache block and the written by filed is==B, the received read request is handled by satisfying the read.
10 Additional Systems Various features of the techniques described herein can be implemented on the multi-core processor based systems as described in U.S. Pat. Nos. 7,577,820, and 7,805,575, and commonly-owned U.S. patent application Ser. Nos. 12/028, 002, 12/582,443, 12/885,957, and 13/280,927 each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple processes executing on a single processor, or multiple single-core and/or multi-core processors.

It is further understood that some of the techniques described herein can be implemented as computer program products that include executable instructions to perform stated functional operations on a processor in one or more processor cores. The computer program product is tangibly stored in non-transitory media that is a physical device. Examples of non-transitory media include semiconductor-based, optical-based, and magnetic-based storage devices and/or systems.

It is to be understood that the foregoing description is intended to illustrate and not to limit the scope of the invention, which is defined by the scope of the appended claims. Other embodiments are within the scope of the following claims.

What is claimed is:

1. A method for multi-processor communication among plural nodes of a multi-processor, the method comprising:
performing by a sender node of the plural nodes, (sender node) a fetch and add operation;
remapping the fetch and add operation to an associated conditional atomic operation;
sending the associated conditional atomic operation to a receiver node of the plural nodes, (receiver node) over a fabric transport of the multi-processor; and
atomically converting by the receiver node the associated conditional atomic operation to a FetchAddGEZ operation.

2. The method of claim 1, further comprising:
coordinating by the sender node and the receiver node on a set of FetchAddGEZ memory locations to be used for FIFO controls.

3. The method of claim 1, further comprising:
reading by the receiver node a current memory location from the coordinated set of memory locations used for the FIFO controls;
adding by the receiver node a value from the fetch and add operation to the value from the current memory location; and
testing by the receiver node a value resulting from the adding operation.

4. The method of claim 2, wherein if the result from the adding operation is greater than or equal to zero, the result is committed to memory and otherwise, the memory is left intact and the original memory contents are returned to the sender.

5. The method of claim 2 wherein the fabric transport is PCI Express or Ethernet.

6. The method of claim 5 wherein the fabric transport is PCI Express and serialization hardware in the PCI Express fabric transport conditionally performs the conditional atomic operation.

7. The method of claim 2, further comprises:
providing the FetchAddGEZ operation as a layered service; and
deploying a shared FIFO for communication between the sender and the receiver nodes over the fabric.

8. A method for multi-processor communication among plural nodes of a multi-processor using shared FIFOs, the method comprising:
performing by a sender node of the plural nodes, (sender node) a FetchAndAdd operation to provide a value;

remapping by the sender node, the FetchAndAdd operation to an associated conditional atomic operation on a fabric transport; and sending the associated conditional atomic operation to a receiver node of the plural nodes, (receiver node) over a fabric transport for conversion to an operation.

9. The method of claim 8, further comprising:
coordinating by the sender node with the receiver node, to determine a set of memory locations to be used for FIFO controls of the shared FIFOs.

10. The method of claim 9 wherein the associated atomic operation is converted to a FetchAddGEZ operation and the set of memory locations are locations storing values from the FetchAddGEZ operation.

11. The method of claim 5 wherein the conditional atomic operation allows serialization hardware to conditionally perform the operation based on current memory contents.

12. The method of claim 5 wherein the associated atomic operation is converted to a FetchAddGEZ operation.

13. The method of claim 12 wherein the FetchAddGEZ operation is an operation that fetches a current value, adds a value to the current value, and tests if a result is greater than or equal to zero.

14. A method for multi-processor communication among plural nodes of a multi-processor using shared FIFOs and a FetchAndAdd operation, the method comprising:
reading by a receiver node of the plural nodes, (receiver node) a current memory location determined from a coordinated set of memory locations that are used for FIFO controls;
adding by the receiver node a value resulting from a FetchAndAdd operation to a value read from the current memory location; and
testing by the receiver node a value resulting from the adding operation.

15. The method of claim 14 wherein if the value resulting from the adding operation is greater than or equal to zero, the resulting value is committed to memory.

16. The method of claim 14 wherein if the value resulting from the adding operation is not greater than or equal to zero, the current memory location is left intact and the original memory contents are returned to the sender.

17. A computing system comprising:
a tiled multicore processor that includes plural processor tiles, with the processor tiles comprising a processor, memory, and a switch;
a fabric coupling the plurality of tiles; and the tiled multicore processor configurable to:
communicate using shared FIFOs over the fabric;
perform by a sender tile of the plural processor tiles (sender tile) a fetch and add operation;
remap the fetch add operation to an associated conditional atomic operation;
send the associated conditional atomic operation to a receiver tile of the plural processor tiles (receiver tile) over the fabric; and
atomically convert by the receiver node the remapped operation to a FetchAddGEZ operation.

18. The system of claim 17 wherein the tiled multi-processor is further configurable to:
coordinate on a set of FetchAddGEZ memory locations to be used for FIFO controls by the sender tile and the receiver tile.

19. The system of claim 17 wherein the tiled multi-processor is further configurable to:
read by the receiver node a current memory location from the coordinated set of memory locations used for the FIFO controls;
add by the receiver tile the value from the fetch and add operation to the value from the current memory location; and
test by the receiver tile the value resulting from the adding operation.

20. The system of claim 17 wherein if the result from the adding operation is greater than or equal to zero, the result is committed to memory and otherwise, the memory is left intact and the original memory contents are returned to the sender tile.

21. The system of claim 17 wherein the fabric transport is PCI Express or Ethernet.

22. The system of claim 17 wherein the fabric transport is PCI Express, and serialization hardware in the PCI Express fabric transport conditionally performs the conditional atomic operation.

23. The system of claim 17 wherein the FetchAddGEZ operation is a layered service and system further comprises:
a shared FIFO for communication between the sender tile and the receiver tile over the fabric using the FetchAddGEZ operation as a layered service.

\* \* \* \* \*